US011001374B2

(12) United States Patent
Kawiecki

(10) Patent No.: US 11,001,374 B2
(45) Date of Patent: May 11, 2021

(54) SYSTEM AND METHOD FOR VERTICAL TAKE-OFF IN AN AUTOGYRO

(71) Applicant: THE BOEING COMPANY, Chicago, IL (US)

(72) Inventor: Grzegorz Marian Kawiecki, El Escorial (ES)

(73) Assignee: THE BOEING COMPANY, Chicago, IL (US)

(*) Notice: Subject to any disclaimer, the term of this patent is extended or adjusted under 35 U.S.C. 154(b) by 827 days.

(21) Appl. No.: 15/705,099

(22) Filed: Sep. 14, 2017

(65) Prior Publication Data
US 2019/0077501 A1    Mar. 14, 2019

(51) Int. Cl.
  *B64C 27/02*  (2006.01)
  *B64F 1/34*  (2006.01)
(52) U.S. Cl.
  CPC .......... *B64C 27/025* (2013.01); *B64C 27/021* (2013.01); *B64C 27/022* (2013.01); *B64C 27/023* (2013.01); *B64F 1/34* (2013.01)
(58) Field of Classification Search
  CPC ... B64C 27/025; B64C 27/023; B64C 27/022; B64C 27/021; B64F 1/34
  See application file for complete search history.

(56) References Cited

U.S. PATENT DOCUMENTS

| | | |
|---|---|---|
| 3,426,982 A | 2/1969 | Markwood |
| 4,711,415 A | 12/1987 | Binden |
| 4,841,124 A * | 6/1989 | Cox ........................ B64D 15/12 |
| | | 219/201 |
| 5,269,657 A | 12/1993 | Garfinkle |
| 5,383,767 A | 1/1995 | Aubry |
| 5,544,844 A | 8/1996 | Groen et al. |
| 5,681,013 A | 10/1997 | Rudolph |
| 6,077,041 A | 6/2000 | Carter, Jr. |
| 6,196,800 B1 * | 3/2001 | Bauer ..................... B64C 27/33 |
| | | 416/107 |
| 6,318,677 B1 | 11/2001 | Dixon |
| 6,471,158 B1 | 10/2002 | Davis |

(Continued)

FOREIGN PATENT DOCUMENTS

| | | |
|---|---|---|
| CN | 1483634 A | 3/2004 |
| CN | 205168896 U | 4/2016 |

(Continued)

OTHER PUBLICATIONS

Nderjit Chopra, "Design and analysis trends of helicopter rotor systems" (Year: 1994).*

(Continued)

*Primary Examiner* — Assres H Woldemaryam
(74) *Attorney, Agent, or Firm* — Moore IP Law

(57) ABSTRACT

An autogyro includes a frame and a rotor hub coupled to the frame. The autogyro also includes a connector coupled to the rotor hub and configured to couple the rotor hub to a ground-based pre-rotator device to rotate the rotor hub during a vertical take-off operation. The autogyro further includes a plurality of rotor blades coupled to the rotor hub, each rotor blade configured such that rotation of the rotor hub, during the vertical take-off operation, results in twisting the rotor blade from a first blade pitch distribution to a second blade pitch distribution.

20 Claims, 10 Drawing Sheets

(56) References Cited

U.S. PATENT DOCUMENTS

| | | | | |
|---|---|---|---|---|
| 8,821,128 | B2* | 9/2014 | Bianchi | F03D 1/0675 |
| | | | | 416/226 |
| 2008/0317600 | A1 | 12/2008 | Enevoldsen et al. | |
| 2009/0020652 | A1 | 1/2009 | Rincker et al. | |
| 2010/0001120 | A1 | 1/2010 | Sun | |
| 2012/0025011 | A1* | 2/2012 | Hsueh | B64C 27/025 |
| | | | | 244/17.11 |
| 2015/0191255 | A1* | 7/2015 | Zolich | B64F 1/125 |
| | | | | 340/946 |
| 2016/0207617 | A1 | 7/2016 | Sada-Salinas | |
| 2016/0221675 | A1* | 8/2016 | Adam | B64C 27/82 |
| 2019/0077501 | A1 | 3/2019 | Kawiecki | |

FOREIGN PATENT DOCUMENTS

| | | |
|---|---|---|
| DE | 10151954 A1 | 4/2003 |
| EP | 0459937 A1 | 12/1991 |
| EP | 2186728 A1 | 5/2010 |
| GB | 529243 | 11/1940 |
| GB | 666491 A | 2/1952 |
| RU | 2027642 C1 | 1/1995 |
| RU | 2181332 C2 | 4/2002 |
| RU | 2228284 C2 | 5/2004 |
| RU | 2228285 C2 | 5/2004 |
| RU | 2659716 C1 | 7/2018 |
| RU | 2673933 C1 | 12/2018 |
| WO | 198204426 A1 | 12/1982 |
| WO | 9708050 A1 | 3/1997 |
| WO | 200061918 | 10/2000 |
| WO | 2016118554 A1 | 7/2016 |

OTHER PUBLICATIONS

"A car that flies, a plane that drives", PAL-V, 2016, 9 pages.
"Lifting personal transportation into the third dimension", mycopter, 2016, 1 page.
"Afzal Suleman", University of Victoria, Mechanical Engineering, 2015, 2 pages.
"Autogyro/Gyrocopter", DLR Institute of Flight Systems, 2011, 5 pages.
"Best Flying Cars concepts: Terrafugia Transition, Aeromobil, PAL-V—which one u prefer?", YouTube, 2016, 4 pages.
"CarterGyro Demonstrator Jump Takeoff Gyrocopter", YouTube, Published Apr. 5, 2007. <https://www.youtube.com/watch?v=CFNc1iY8wi0>.
"Letting fly", the Engineer, Jan. 17, 2006, 5 pages.
"Maintenance Manual, Gyroplane Type Calidus (UK spec only)", RotorSport UK Ltd, Jan. 27, 2010, 90 pages.
"RC Autogyro Mega", Mega Motor, 2012, 1 page.
"Research and Markets: The Global Unmanned Aerial Vehicle Market 2015-2025—Market Size and Drivers of the $115 Billion Industry", BusinessWire, 2015, 3 pages.
"The Business of Luxurious Cars: Must-Read Reports & Analysis", ReportLinker, 2016, 3 pages.
"The Transition", TERRAFUGIA, 2016, 4 pages.
"USB Pro Data Recorder", Eagle Tree Systems, 2013, 2 pages.
"Volocopter", 2016, 4 pages. <https://www.volocopter.com/de/>.
"What do you think? The roadable aircraft", Airwork, May 2, 2010, 5 pages.
Ali, "Pilotless Flying Cars versus Driverless Cars", All about Safety Engineering, Dec. 22, 2015, 5 pages.
Eddy, "Google's Larry Page Investing Millions in Flying Cars", InformationWeek, Jun. 9, 2016, 9 pages.
Linn, "Flying car not as far-fetched a fantasy as you might think", Honolulu Advertiser, Aug. 29, 2004, 2 pages.
Majhi, et al., "Modeling Helicopter Rotor Blade Flapping Motion Considering Nonlinear Aerodynamics", Tech Science Press, CMES, vol. 27, No. 1, 2008, 13 pages.
Tielin, et al., "A Fast Method of Aerodynamic Computation for Compound Gyroplane", Aug. 15-16, 2015, 6 pages.

Warwick, "Airbus Reveals Urban Air-Transport Projects", Aviation Daily, Aug. 2, 2016, 4 pages.
Wheatley, et al., "Analysis and Model Tests of AutoGiro Jump Take-Off", National Advisory Committee for Aeronautics, No. 582, Washington, Oct. 1936, 31 pages.
Johnson, Wayne "Helicopter Theory", Princeton University Press, 1980, pp. 1-961.
Lentz, W. Karl, et al., "Optimum Coupling in Thin-Walled, Closed-Section Composite Beams", Journal of Aerospace Engineering, vol. 11, Jul. 1998, 10 pgs.
Shete, C. D., et al., "Optimal control of a pretwisted shearable smart composite rotating beam", Acta Mechanica, vol. 191, 2007, pp. 37-58.
Mega Motor <http://www.megamotor.cz/v4/script/default.php?&sid=3038784308810fc1465c3397b23c4429&page_id=lang_eng> retrieved Sep. 12, 2017, 1 pg.
Oh, S.-Y. et al., "Thin-walled Rotating Composite Blades Featuring Extension-Twist Elastic Coupling," AIAA Paper 2004-2049, 45th AIAA/ASME/ASCE/AHS/ASC Structures, Structural Dynamics & Materials Conference, Apr. 19-22, 2004, Palm Springs, CA., 13 pgs.
Nangia, R. K. et al., 2007, "Leading-Edge Vortex Flaps on Moderate Sweep Wings—UCAV, Flow improvement at High Lift," AIAA Paper 2007-267, 45th AIAA Aerospace Sciences Meeting and Exhibit, Jan. 8-11, 2007, Reno, Nevada, 17 pgs.
Swanton, E. W. M., et al., "Leading Edge Vortex Stability in a Flapping Model Hummingbird Wing," AIAA Paper 2008-3718, 38th Fluid Dynamics Conference and Exhibit, Jun. 23-26, 2008, Seattle, Washington, 23 pgs.
Lake, R. C. et al., "Experimental and Analytical Investigation of Dynamic Characteristics of Extension-Twist-Coupled Composite Tubular Spars," NASA TP 3225, ARL Technical Report 30, Feb. 1993, 60 pgs.
Brown, W., "Microwave Energy Transmission," Third Princeton/AIAA Conference on Space Manufacturing Facilities, Princeton, N. J., May 9-12, 1977, 9 pgs.
Nixon, M., "Extension-Twist Coupling of Composite Circular Tubes with Application to Tilt Rotor Blade Design," AIAA Paper 87-0772, Structures, Structural Dynamics and Materials Conference, 28th, Monterey, CA, Apr. 6-8, 1987, pp. 295-303.
Alden, A. et al., "Some Recent Developments in Wireless Power Transmission to Micro Air Vehicles," AIP Conference Proceedings, 2005, vol. 766, pp. 303-307.
Hodges, D. H., "Torsion of Pretwisted Beams Due to Axial Loading," ASME Journal of Applied Mechanics, vol. 47, 1980, pp. 393-397.
"Global Parcel Delivery Market Insight Report 2015—Combined Revenues of Carriers Covered in this Report Amounts to US$150 Billion," Research and Markets, Nov. 27, 2015, 2 pgs.
Brindejonc, A., "Design and Testing of an Autorotative Payload Delivery System: The Autobody," Thesis submitted to the Faulty of the Graduate School of the University of Maryland, 2005, 158 pgs.
Hubel, T. Y., "The importance of leading edge vortices under simplified flapping flight conditions at the size scale of birds," The Journal of Experimental Biology, vol. 213, 2010, pp. 1930-1939.
Leishman, J., "Principles of Helicopter Aerodynamics," Cambridge University Press 2006, Chapter 12/Autogiros and Gyroplanes, pp. 706-709.
Lentink, D., et al., "Leading-Edge Vortices Elevate Lift of Autorotating Plant Seeds," Science, vol. 324, Jun. 12, 2009, pp. 1438-1440.
Nampy, S. N., et al., "Extension-Twist Coupled Tiltrotor Blades Using Flexible Matrix Composites," 46th AIAA/ASME/ASCE/AHS/ASC Structures, Structural Dynamics and Materials Conference, Apr. 18-21, 2005, pp. 1-19.
Nampy, S. N., et al., "Thermomechanical Behavior and Experimental Testing of Flexible Matrix Composite Box-Beams with Extension-Twist Coupling," 47th AIAA/ASME/ASCE/AHS/ASC Structures, Structural Dynamics, and Materials Conference, May 1-4, 2005, pp. 1-15.
Ozbay, S., et al., "Optimum stacking sequences for extension-twist coupled composites subject to thermal stresses," Adv. Composite Mater., vol. 15, No. 2, pp. 127-137.
Prouty, R., "Helicopter Aerodynamics", Chapter 92—A New Look at the Autogyro, 2007, p. 495.

(56) References Cited

OTHER PUBLICATIONS

Thomson, D. G. et al., "Application of Parameter Estimation to Improved Autogyro Simulation Model Fidelity," Journal of Aircraft, vol. 42, No. 1, Jan.-Feb. 2005, pp. 33-40.
Wikipedia, "AutoGyro Calidus," https://en.wikipedia.org/wiki/AutoGyro_Calidus> retrieved Apr. 3, 2019, 3 pgs.
Extended European Search Report dated Oct. 16, 2019 mailed in corresponding EP Application No. 19382343, 9 pgs.
McCrink M. H. and Gregory J. W., 2017, "Blade Element Momentum Modeling of Low-Reynolds Electric Propulsion Systems," Journal of Aircraft, vol. 54, No. 1, pp. 163-176, January-February.

\* cited by examiner

SYSTEM AND METHOD FOR VERTICAL TAKE-OFF IN AN AUTOGYRO

FIELD OF THE DISCLOSURE

The present disclosure is generally related to autogyros and ground based pre-rotators.

BACKGROUND

An autogyro is an aircraft that flies due to a lifting force generated by an unpowered rotor in a state of autorotation. Autorotation is achieved due to an upflow of air that causes the rotation of the unpowered rotor. The upflow (e.g., upward inflow) generated by the forward motion of the aircraft combined with the angular motion of the rotor generates a system of airloads on rotor blades of the unpowered rotor that sustains the rotation of the rotor to generate the lifting force. That system of airloads remains in equilibrium and generates a lifting force, as long as there is a sufficient mass of air flowing upwards through the unpowered rotor. That upflow is induced by the motion of the aircraft due to the action of a thrust generating device (e.g., a propeller or a jet engine), the action of gravitational force, or both. As compared to a helicopter, an autogyro generally has an unpowered rotor typically with a fixed pitch (e.g., a fixed mast pitch and fixed rotor blade pitch) and requires some length of runway for both take-off and landing. A takeoff run is used to provide the upwards air flow through the rotor so that the rotor enters into autorotation and generates a sufficient thrust for a liftoff.

In order to enable the autogyro to take-off vertically (referred to as a jump take-oft), the rotor is rotated (e.g., pre-rotated) by a power unit so that the rotor begins generating lift before the autogyro begins to move in a forward direction. Autogyros may include a separate pre-rotator device on-board the autogyro or may use power from the autogyro engine (which otherwise produces power for the thrust propeller) via a clutched drive system. Such pre-rotator solutions are not optimized for cruise and carry a weight and performance penalty.

Additionally, preforming jump take-offs adds complexity to the rotor system. The rotor is either pre-rotated to very high speeds, as compared to rotational speed during cruise, or the rotor is configured to include mechanical (e.g., active) rotor blade pitch control. In operation, the rotor blade pitch is initially set to zero lift pitch to reduce the drag on the rotor and to reduce the requirements for spinning-up the rotor. Once the rotor has been spun-up, the pitch of the rotor blades is suddenly increased, which increases the angle of attack of the rotor blades causing the autogyro to vertically ascend in a "jump take-off" maneuver.

Such configurations to perform jump take-offs significantly increase the complexity of the rotor because the rotor is configured to physically (e.g., mechanically) adjust the pitch of the rotor blades or the rotor is designed to withstand relatively high angular velocities to generate a lifting force for a jump take-off at a relatively low blade pitch typical for autorotating rotors. As a result, the weight, cost, and maintenance of the autogyro increase to the point where the autogyro is nearly as costly as a helicopter.

SUMMARY

In a particular implementation, an autogyro includes a frame and a rotor hub coupled to the frame. The autogyro also includes a connector coupled to the rotor hub and configured to couple the rotor hub to a ground-based pre-rotator device to rotate the rotor hub during a vertical take-off operation. The autogyro further includes a plurality of rotor blades coupled to the rotor hub, each rotor blade configured such that rotation of the rotor hub, during the vertical take-off operation, results in twisting the rotor blade from a first blade pitch distribution to a second blade pitch distribution.

In another particular implementation, a system includes an aircraft and a ground-based station. The autogyro includes a frame and a rotor hub coupled to the frame. The autogyro also includes a connector coupled to the rotor hub and configured to couple the rotor hub to a ground-based pre-rotator device to rotate the rotor hub during a vertical take-off operation. The autogyro further includes a plurality of rotor blades coupled to the rotor hub, each rotor blade configured such that rotation of the rotor hub, during the vertical take-off operation, results in twisting the rotor blade from a first blade pitch distribution to a second blade pitch distribution. The ground-based station includes the ground-based pre-rotator device configured to rotate the rotor hub. The ground-based station further includes an energy source configured to provide energy to the ground-based pre-rotator device.

In another particular implementation, a method of performing a vertical take-off operation of an autogyro includes, while the autogyro is coupled to a ground-based station, initiating rotation of a rotor hub of the autogyro. The method also includes, responsive to rotation of the rotor hub, twisting each of a plurality of rotor blades coupled to the rotor hub from a first blade pitch distribution to a second blade pitch distribution. The method includes decoupling the autogyro from the ground-based station. The method further includes vertically taking-off, by the autogyro, while the plurality of rotor blades are oriented at the second blade pitch distribution.

Because the autogyro includes passive twist rotor blades or passive twist links between the blade and the hub and is coupled to a ground based pre-rotator device, the autogyro is lighter and has less complexity as compared to autogyros that perform vertical take-offs with mechanical blade pitch angle control mechanisms, on-board pre-rotator devices, or both. The features, functions, and advantages described can be achieved independently in various embodiments or may be combined in yet other embodiments, further details of which can be found with reference to the following description and drawings.

DETAILED DESCRIPTION

Figure 1:
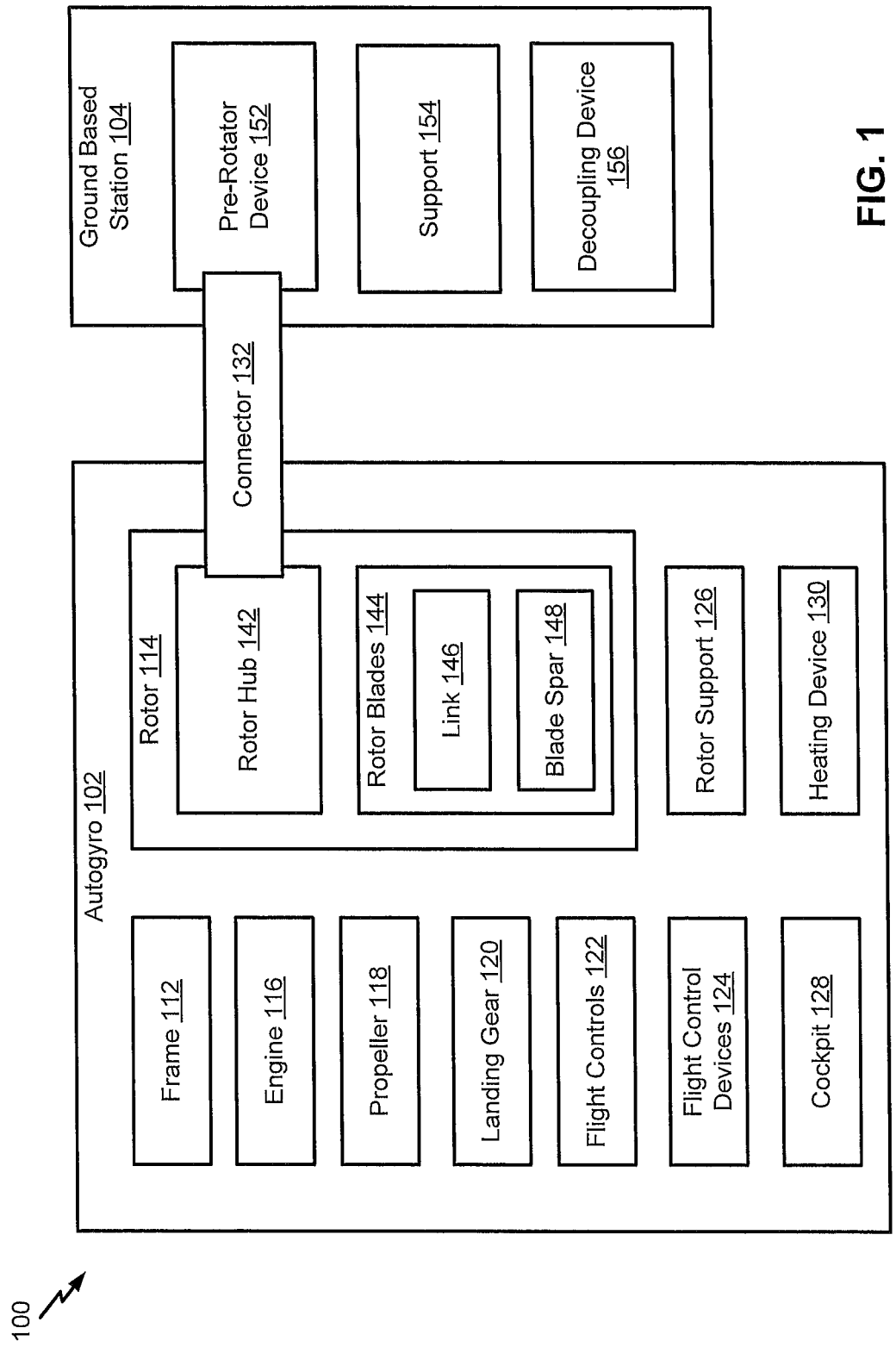
FIG. 1 is a block diagram that illustrates a system including an autogyro and a ground-based station.

Implementations described herein are directed to a system and method for operating an autogyro having passive twist rotor blades and configured to be powered by a ground-based station during vertical take-off. The autogyro includes rotor blades having links or blade spars with extension-twist coupling that twist the rotor blades to increase a pitch angle (e.g., a rotor blade pitch angle) of the rotor blades responsive to centrifugal forces (e.g., centripetal forces) generated by rotation of the rotor. In some implementations, the links are made from flexible matrix composites (e.g., a laminate of composite materials or a composite laminate) or other materials that display extension-twist coupling behavior. The flexible matrix composites may have an anti-symmetrical fiber orientation that enables extension-twist coupling. Extension-twist Coupling is a property of a material or an object that causes the object or the material to experience twisting deformation about an axis of an applied axial load, such as a load generated by centrifugal forces during rotation. The rotation causes an increase in the pitch angle of the rotor blades and causes the rotor blades to generate increased lift. Additionally, or alternatively, the links may include a passive device that exhibits behavior similar to extension-twist coupling behavior. For example, the passive device includes a moveable shaft to rotate or twist the rotor blades responsive (passively or automatically) to a change in the magnitude of centrifugal force.

The passive twist of the rotor blades can be used in place of mechanical rotor blade pitch control mechanisms, which results in lower complexity and weight. Additionally, passive twist rotor blades reduce stress on the rotor hub and rotor supports as compared to rotors without blade pitch control because the rotor can generate more lift when rotated at slower speeds. The lower rotational speeds reduce stress on the rotor hub and rotor supports, which results in complexity and weight reduction. Complexity and weight reduction increases autogyro performance and lowers costs of the autogyro.

The passive twist of the rotor blades and increased lift can be utilized to perform a vertical take-off (e.g., a jump take-off). To illustrate, the autogyro may perform a vertical take-off by coupling to the ground-based station to restrain the autogyro from moving while a pre-rotator device of the ground-based station rotates the rotor to a take-off speed, referred to as spinning-up the rotor. As the rotor is being spun-up, the rotor blades experience an increase in centrifugal forces, causing the rotor blades to twist and increase the rotor blade pitch angle from a first pitch angle (e.g., a resting or design pitch angle) to a second pitch angle. Once the rotor is spun-up, the autogyro is detached from the ground based station (e.g., the rotor is detached from the pre-rotator device) and the autogyro vertically ascends due to kinetic energy stored in the rotor blades. The autogyro vertically takes-off (e.g., lifts-off) while the rotor blades are oriented at the second blade pitch angle larger than the first blade pitch angle. The rotor blades are oriented at the second blade pitch angle at the instance or moment of lift-off. As the autogyro gains altitude, the rotational speed of the rotor slows down, and the rotor blades decrease in blade pitch angle from the second blade pitch angle to a third blade pitch angle associated with a cruising speed. An engine and a propeller of the autogyro are engaged, and the autogyro begins to fly in forward flight without the weight penalty of an on-board pre-rotator device and without the weight penalty of mechanical rotor blade control mechanisms.

Thus, the autogyro is capable of performing a vertical take-off procedure without using mechanical rotor blade pitch controls, such as a Collective control (which changes rotor blade pitch angle by the same amount). Additionally, the autogyro does not have to rotate the rotor as fast as autogyros with fixed rotor blade pitch because the rotor blades twist passively to increase blade pitch and lift. Furthermore, the autogyro is less complex and weighs less than autogyros with mechanical rotor blade pitch control. Consequently, the autogyro has increased fuel efficiency and reduced weight and drag as compared to autogyros with on-board pre-rotator devices, with mechanical rotor blade pitch control mechanisms, or both. Accordingly, an autogyro with passive twist rotor blades produces lower carbon emissions and has reduced fuel costs as compared to an autogyro with an on-board pre-rotator device, with active rotor blade pitch control mechanisms, or both.

FIG. 1 illustrates an example of a system 100 including an autogyro 102 and a ground-based station 104. The autogyro 102 is configured to perform a vertical take-off (e.g., a jump take-off) operation from the ground-based station 104. The ground-based station 104 includes a pre-rotator device 152 (i.e., a ground-based pre-rotator device) configured to rotate or power the rotor 114 during the vertical take-off operation. Accordingly, the autogyro 102 does not include the pre-rotator device 152 and the autogyro 102 weighs less as compared to autogyros that include a pre-rotator device to perform a vertical take-off operation. Additionally, the autogyro 102 includes passive rotor blade pitch adjustment. Rotor blade pitch adjustment adjusts rotor blade pitch distribution and increases lift, as described with reference to FIG. 7. Rotor blade pitch distribution corresponds to a pitch angle of the rotor blade along a length of the rotor blade. The rotor blade pitch distribution may include different pitch angles along a length of the rotor blade. For example, a tip of the rotor blade may be at a larger pitch angle than a root of the rotor blade. Each blade pitch distribution (e.g., a first, a second, etc.) may include a corresponding angle of attack (e.g., a first, a second, etc.) at a particular portion of the rotor blade. For example, when the plurality of rotor blades 144 are at the first blade pitch distribution, a midpoint of the plurality of rotor blades 144 may be at the first angle of attack at a specific point during a cycle of rotation.

Accordingly, the autogyro 102 does not include mechanical angle of attack control mechanisms, and the autogyro 102 weighs less as compared to autogyros that include mechanical angle of attack control mechanisms. The passive angle of attack adjustment occurs during the vertical take-off operation and during flight. The passive angle of attack adjustment reduces rotational speeds of the rotor and loads on the rotor during the take-off operation. Accordingly, the autogyro 102 can be designed lighter because the rotor can be lighter and less complex as compared to autogyros that perform a vertical take-off from a ground-based station.

The autogyro 102 includes a frame 112, a rotor 114, and a connector 132. The frame 112 is configured to support components of the autogyro 102. The frame 112 may include or correspond to a fuselage or a body of the autogyro 102. The rotor 114 is coupled to the frame 112. The rotor 114 is configured to generate lift and is unpowered after decoupling from the ground station. For example, the rotor 114 generates lift through autorotation where incoming air moves upward through the rotor 114, rather than the rotor 114 being driven by an engine and forcing incoming air downwards (as in a helicopter). The rotor 114 includes a rotor hub 142 and a plurality of rotor blades 144. Each of the plurality of rotor blades 144 includes a link 146 and a blade spar 148. The plurality of rotor blades 144 are coupled to the rotor hub 142 via the corresponding link 146. The link 146, the blade spar 148, or both may provide extension-twist coupling behavior, and the link 146 is described further with reference to FIGS. 3 and 4. Additionally or alternatively, the link 146 may include a passive device that exhibits behavior similar to extension-twist coupling, as described further with reference to FIG. 6.

Generally, rotor blades have a twist (e.g., a designed twist), a change or variation in rotor blade pitch from root to tip. Rotor blades generally have a greater pitch angle at the root (near the rotor hub 142) than at the tip because the tip of the rotor blade moves at increase speed compared to the root. This designed twist variation is different from mechanical (e.g., active) or passive rotor blade pitch control. In mechanical control rotor blade pitch control systems, the rotor blades are tilted by mechanical devices (e.g., a swashplate) to adjust the rotor blade pitch. In passive rotor blade pitch systems, the links 146, the blade spars 148, or both, may have extension-twist coupling and are configured to passively control the rotor blade pitch by twisting responsive to rotational speed, which causes the twist (or blade pitch distribution) of the rotor blade. In passive twist systems, the rotor blade is not controlled by a mechanical system. In some implementations, making the rotor blade from fiber reinforced composite materials with a particular anti-symmetrical fiber layout may alter the twist or pitch angle of the rotor blade from the root to the tip (e.g., the blade pitch distribution). In some passive twist systems, the link 146, the blade spars 148, or both, are said to be flexible.

The connector 132 is coupled to the rotor 114 and configured to couple to the pre-rotator device 152 of the ground-based station 104. The connector 132 is configured to transfer power from the pre-rotator device 152 to the rotor 114. In a particular implementation, the connector 132 is configured to selectively couple the rotor hub 142 to the pre-rotator device 152 to rotate (e.g., spin-up) the rotor hub 142 during a vertical take-off operation. For example, the connector 132 may be coupled to a shaft (e.g., a rotor mast) of the rotor 114. As another example, the connector 132 may be coupled to a gear of the rotor hub 142 or coupled to the rotor hub 142. In some implementations, the connector 132 is configured to decouple from the pre-rotator device 152 under tension generated during the vertical take-off operation. For example, the tension may be caused by the autogyro 102 lifting off from the ground-based station 104. The connector 132 may include mechanical linkage. For example, the connector 132 may include one or more driveshafts, one or more gears, a universal joint, a quick connect/disconnect fitting, or a combination thereof. An example of the connector 132 is further described with reference to FIG. 2.

The autogyro 102 further includes an engine 116, a propeller 118, landing gear 120, flight controls 122, and flight control devices 124. The engine 116 is configured to drive the propeller 118 to move the autogyro 102. For example, the engine 116 drives the propeller 118 to move (e.g., fly) the autogyro 102 while the autogyro 102 is in the air. Additionally, the engine 116 may drive the propeller 118 to move (e.g., drive) the autogyro 102 while the autogyro 102 is on the ground. The engine 116 may include or correspond to an internal combustion engine, an electric engine, or a hybrid engine. Movement of the autogyro 102 rotates the rotor 114 and provides lift. To illustrate, incoming airflow generated by movement of the autogyro 102 drives (rotates) the rotor 114, referred to as autorotation. The engine 116 and the propeller 118 (or a plurality of propellers) are arranged in a pusher configuration or a tractor configuration.

In some implementations, the engine 116 is configured to direct heat (e.g., exhaust) to the plurality of rotor blades 144 to increase a temperature of the plurality of rotor blades 144. The increase in the temperature of the plurality of rotor blades 144 results in each of the rotor blades being more complaint or deformable (e.g., lowers an extension-twist coupling stiffness). For example, each of the rotor blades 144 may increase in pitch angle or angle of attack for a given speed. To illustrate, during a landing operation (e.g., a vertical landing or landing pad landing), heat generated by the engine 116 is selectively directed to the plurality of rotor blades 144 such that the each of the plurality of rotor blades 144 twists to increase an angle of attack of the plurality of the rotor blades. As an illustrative non-limiting example, exhaust gasses generated by the engine 116 may be selectively directed to the plurality of rotor blades 144 by activating a valve to direct the exhaust gasses to an auxiliary exhaust port near the rotor hub 142 and to block the exhaust gassed from exiting a primary exhaust port. The temperature control may be also provided by a number of other effects, such as chemical reactions or pyrotechnic devices.

The landing gear 120 is coupled to the frame 112 and may include or correspond to a set of wheels or skids. In some implementations, the landing gear 120 is retractable. In implementations where the landing gear 120 include a set of wheels, one or more wheels of the set of wheels may be controllable (e.g., steerable). For example, the one or more wheels may be turned to adjust a direction of the autogyro 102 when being driven on the ground.

The flight controls 122 are configured to move and direct the flight control devices 124. The flight control devices 124 are configured to adjust an attitude (e.g., pitch, roll, and yaw directions) of the autogyro 102 while the autogyro 102 is in the air. The flight control devices 124 may include autogyro flight control devices (such as rotor axis titling), aircraft flight control devices, helicopter flight control devices, or a combination thereof. The aircraft flight control devices may include elevator, flaps, ailerons, rudder, tail, leading edge vortex flaps, or other flight control and flow control surfaces and devices. The helicopter flight control devices may include a swashplate, hinges, or other helicopter flight control devices.

In a particular implementation, the flight controls 122 are remotely controllable. In such implementations, the autogyro 102 (e.g., an electric vertical take-off and landing (eVTOL) aircraft or an unmanned aerial vehicle (UAV)) includes a wireless transceiver configured to send data and receive control inputs. The data is collected by one or more sensors on-board the autogyro 102. In another particular implementation, the flight controls 122 are automated. For example, the autogyro 102 may be an autonomous aircraft and may include an autonomous controller configured to control the autogyro 102 from origin to destination based on data from the on-board sensors. In some implementations, only a portion of the trip from origin to destination is automated, such as a vertical take-off operation, a runway take-off operation, an air segment, a ground segment, a vertical landing operation, a runway landing operation, or a combination thereof.

In some implementations, the autogyro 102 includes a rotor support 126 and a cockpit 128. The rotor support 126 is coupled to the frame 112 and to the rotor 114. The rotor support 126 is configured to couple the rotor 114 to the frame 112 and to support loads generated by the rotor 114. In some implementations, the rotor support 126 is coupled to a shaft or mast of the rotor 114, the rotor hub 142, the connector 132, or a combination thereof. The cockpit 128 is coupled to the frame 112 or corresponds to a portion of the frame 112. The cockpit 128 may include seating for one or more pilots, one or more passengers, or a combination thereof.

In some implementations, the autogyro 102 further includes a heating device 130 distinct from the engine 116 and configured to generate heat to increase a temperature of the plurality of rotor blades 144. For example, the heating device 130 includes or corresponds to resistive heating elements coupled to the plurality of rotor blades 144. In a particular implementation, the resistive heating elements are embedded within or encases by the plurality of rotor blades 144. As another example, the heating device 130 includes or corresponds to an electric heater.

The autogyro 102 is configured to perform vertical take-off and vertical landing operations from the ground-based station. The ground-based station 104 includes a pre-rotator device 152. The pre-rotator device 152 includes at least one of an electric motor, a pneumatic motor, a hydraulic motor, or a mechanical engine coupled to the connector 132. In some implementations, the pre-rotator device 152 includes an energy source, such a battery or a generator. In other implementations, the pre-rotator device 152 is coupled to an energy source of the ground-based station or an external energy source.

In a particular implementation, the pre-rotator device 152 is an energy source, and the autogyro 102 includes at least one of an electric motor, a pneumatic motor, or a hydraulic motor. As an illustrative, non-limiting example, the autogyro 102 includes a brushless electric motor. By removing the energy source from the autogyro 102, the autogyro 102 is lighter than autogyros that include pre-rotator devices and an on-board energy source. In a particular implementation, the motor of the autogyro 102 is modular and is configured to be coupled to and decoupled from the autogyro 102. A modular pre-rotator motor enables the autogyro 102 to include the pre-rotator device on-board if a destination does not have a ground-based station 104.

In some implementations, the ground-based station 104 includes one or more supports 154, a decoupling device 156, or a combination thereof. The one or more supports 154 are configured to support the autogyro 102. For example, the one or more supports 154 may support the autogyro 102 during a vertical take-off procedure, a vertical landing procedure, or when the autogyro 102 is stored. In some implementations, the one or more supports 154 include or correspond to one or more restraints and are configured to provide a restraining force to the autogyro 102. For example, the one or more supports 154 may provide a lateral restraining force, a vertical restraining force, or a combination thereof, to the frame 112 of the autogyro 102. To illustrate, the autogyro 102 may generate lift and torque (rotational forces) when spinning-up the rotor 114 for a vertical take-off operation, and the one or more supports 154 may provide one or more restraining forces that oppose the lift and rotational forces generated by the autogyro 102. In a particular implementation, the one or more supports 154 includes a landing pad. The one or more supports 154 may be coupled to one or more portions of the autogyro 102. For example, the one or more supports 154 may be coupled the frame 112, the landing gear 120, the rotor 114, the connector 132, the rotor support 126, or a combination thereof.

The decoupling device 156 is configured to selectively couple to and decouple from the autogyro 102. In some implementations, the decoupling device 156 is configured to be coupled to the connector 132 of the autogyro 102. In other implementations, the decoupling device 156 is configured to be coupled to the frame 112 of the autogyro 102. The decoupling device 156 may be configured to be activated and deactivated by manual actuation, a control input received from a pilot (e.g., a motorized decoupling device controlled by a switch on-board the autogyro 102), a control input received wirelessly from a pilot on the ground, a control input received from the autonomous controller, or a combination thereof. The decoupling device 156 may include or correspond to a hook, a latch, a clamp, a pin, one or more straps, rope and moorings, etc. The decoupling device 156 may be included in the one or more supports 154 or may be separate from the one or more supports 154.

The operation of the autogyro 102 and the ground-based station 104 is described with reference to FIG. 7. By using passive rotor blade twist and a ground-based pre-rotator device, the autogyro 102 has reduced weight and increased performance as compared to autogyros with on-board pre-rotators, autogyros with mechanical rotor blade control mechanisms, and autogyros that use ground-based pre-rotator devices.

Figure 2:
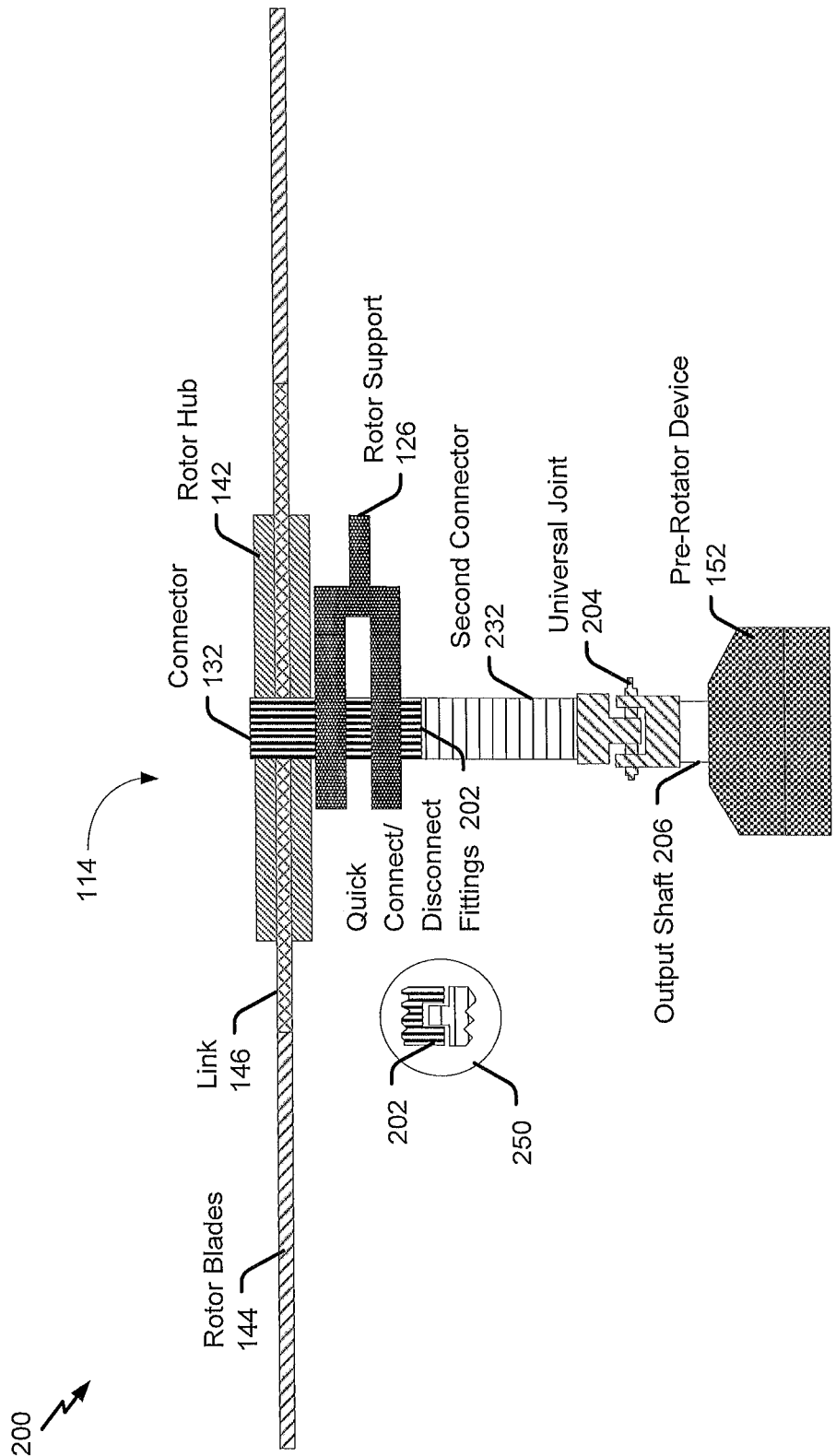
FIG. 2 is a diagram that illustrates an example of a rotor and a connector of an autogyro coupled to a pre-rotator device of a ground-based station.

FIG. 2 is a diagram 200 that illustrates an example of the rotor 114 and the connector 132 of the autogyro 102 of FIG. 1 coupled to the pre-rotator device 152 of the ground-based station 104 of FIG. 1. The rotor 114 includes the rotor hub 142 and the plurality of rotor blades 144 coupled to the rotor hub 142 via the link 146. The rotor support 126 is coupled to the rotor hub 142 to the frame 112 (not shown) and configured to support loads generated by the rotor hub 142.

The connector 132 is configured to couple the rotor 114 to the pre-rotator device 152. The connector 132 may include or correspond to a driveshaft (e.g., a flexible driveshaft or a rigid driveshaft) or a drivetrain. In a particular implementation, the connector 132 includes a drive shaft having a first gear that engages with a corresponding second gear coupled to the rotor hub 142. In some implementations, the connector 132 is coupled to the rotor hub 142 and to the pre-rotator device 152 via mechanical linkage. As illustrated in FIG. 2, a first end (e.g., a proximal end) of the connector 132 is coupled to the rotor hub 142 and a second end (e.g., a distal end) of the connector 132 includes a quick connect/disconnect fitting 202 and is configured to mate with a quick connect/disconnect fitting 202 of a second connector 232.

The quick connect/disconnect fittings 202 are configured to couple and decouple the connector 132 and the second connector 232 under tension, such as tension generated during a vertical take-off operation. The quick connect/disconnect fitting 202 includes or corresponds to a push or pull fitting. An illustrative example of the quick connect/disconnect fitting 202 is illustrated in circle 250. As illustrated in the circle 250 of FIG. 2, the quick connect/disconnect fitting 202 of the connector 132 is a protrusion and the quick connect/disconnect fitting 202 of the second connector includes a receptacle for the protrusion. In other implementations, the quick connect/disconnect fittings 202 may be reversed or "genderless" fittings may be used.

In some implementations, the second connector 232 is coupled to an output shaft 206 of the pre-rotator device 152 via a universal joint 204. The universal joint 204 is configured to transmit power from the output shaft 206 to the second connector 232 at different angles. To illustrate, the universal joint 204 is configured to pivot and swivel to orient the second connector 232 at different angles relative to the output shaft 206. Different types of autogyros may couple to the ground-based station through different angles. The universal joint 204 may allow compatibility with multiple types of autogyros (and allows some "play" to enable easing coupling of the connector 132 and the second connector 232). Additionally, in implementations where the autogyro 102 is not restrained to the ground-based station 104, the universal joint 204 may pivot or swivel to allow the connector 132 to remain coupled to the pre-rotator device 152 as the autogyro 102 ascends. In other implementations, a constant-velocity joint is used to transmit power from the output shaft 206 to the second connector 232 at different angles.

Alternatively, the connector 132 is configured to couple to the output shaft 206. For example, the output shaft 206 includes one of the quick connect/disconnect fittings 202 and couples to the quick connect/disconnect fitting 202 of the connector 132 independent of the second connector 232 and the universal joint 204.

Although the example illustrated in FIG. 2 corresponds to an example where the connector 132 is configured to transfer mechanical (rotational) forces (e.g. torque), in other implementations, the connector 132 is configured to transfer pneumatic, hydraulic, or electric energy or power. In such implementations, the connector 132 includes or corresponds to a pneumatic line or hose, a hydraulic line or hose, or an electric wire or cable. In such pneumatic or hydraulic implementations, the quick connect/disconnect fittings 202 may include a valve (e.g., self-sealing valve) configured to stop the flow of fluid responsive to decoupling the connector 132 from the second connector 232.

Figure 3:
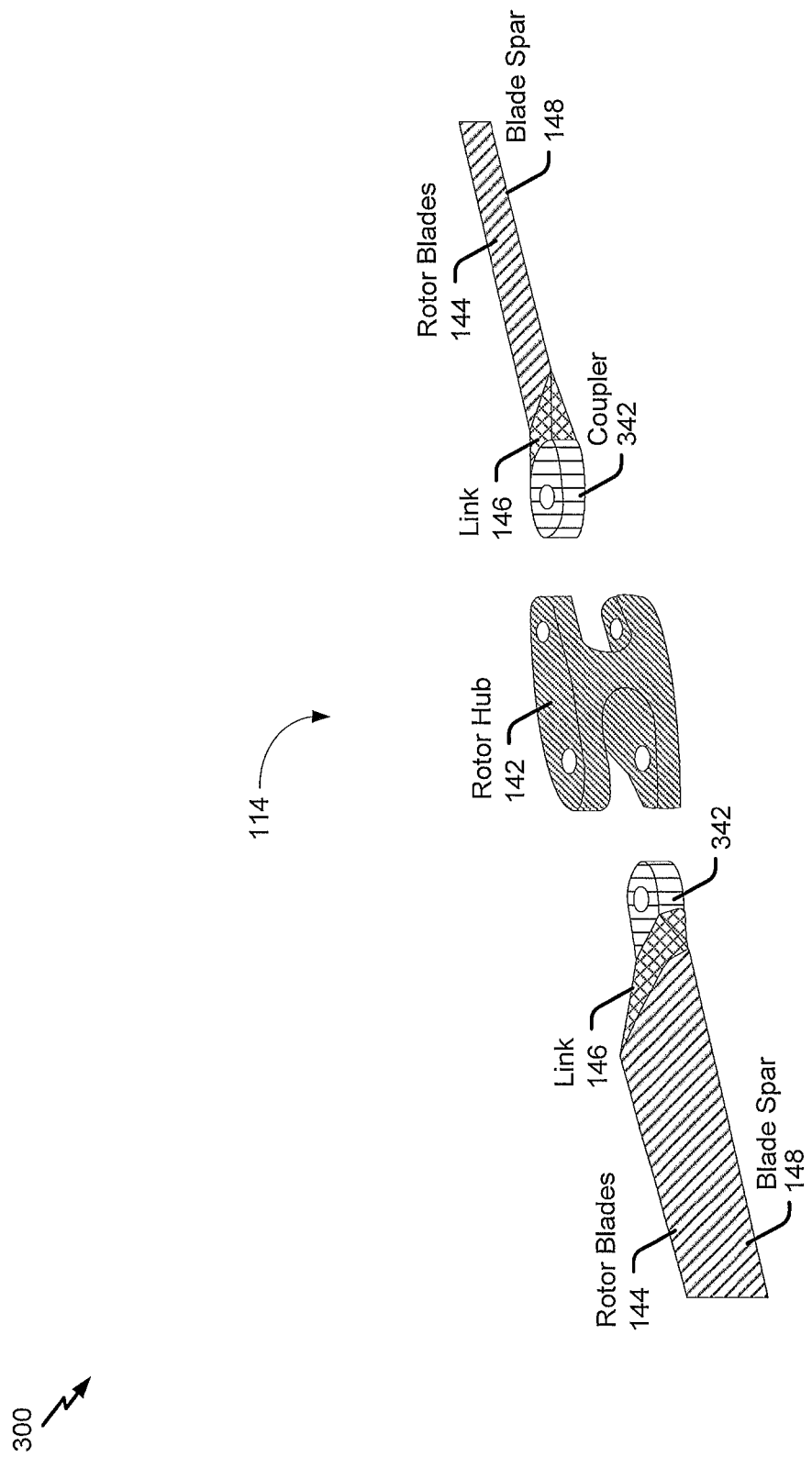
FIG. 3 is a diagram that illustrates a first example of a rotor of an autogyro.

FIG. 3 depicts an example 300 of the rotor 114 of the autogyro 102 of FIG. 1. The rotor 114 includes the rotor hub 142 and the plurality of rotor blades 144. Each of the plurality of rotor blades 144 includes the link 146 and the blade spar 148. Each of the plurality of rotor blades 144 is coupled to the rotor hub 142 via the link 146 and a coupler 342. The coupler 342 is configured to couple the link 146 to the rotor hub 142. In some implementations, the coupler 342 is a rigid or stiff component of the rotor blade 144. For example, the coupler 342 is configured to maintain (or substantially maintain) its shape (e.g., not deform or twist) during rotation of the rotor 114. The coupler 342 may not exhibit extension-twist coupling behavior in response to centrifugal forces. In other implementations, the coupler 342 is a flexible component and exhibits extension-twist coupling behavior in response to centrifugal forces.

In some implementations, the link 146 includes a flexible matrix composite (e.g., a flexible link). The flexible matrix composite of the link 146 includes fibers having an anti-symmetrical fiber orientation, as described further with reference to FIG. 5. The anti-symmetrical fiber orientation may cause the link 146 to exhibit extension-twist coupling behavior. In other implementations, the link 146 includes a carbon fiber reinforced polymer, such as carbon epoxy, or another material that provides extension-twist coupling behavior.

The links 146 may function as an automated Collective control. For example, the links 146 twist to adjust an angle of attack of the plurality of rotor blades 144. To illustrate, rotation of the rotor 114 generates centrifugal forces in a pitch axis along the plurality of rotor blades 144. The centrifugal forces cause the links 146 to deform in a manner that changes an angle of the plurality of rotor blades 144 relative to the pitch axis. The links 146 change shape such that the plurality of rotor blades 144 twist about the pitch axis root to tip. The pitch or feathering angle of each of the plurality of rotor blades 144 may change as each rotor blade rotates with the rotor hub 142. The link 146 may function as an automated and passive feathering hinge that is based on rotational speeds of the rotor 114 and temperature of the plurality of rotor blades 144. Although two rotor blades are illustrated in FIG. 3, in other examples the rotor 114 may include additional rotor blades, such as 3, 4, 5, etc.

In some implementations, at least a portion of the blade spar 148 of the plurality of rotor blades 144 includes a flexible matrix composite. In such implementations, the plurality of rotor blades 144 may have increased angle of attack, as compared to rotor blades the have links 146, because the portion (or the entire) blade spar 148 may twist along the length of the blade spar 148 responsive to centrifugal (or centripetal) force in addition to the link 146 twisting.

The link 146 enables the autogyro 102 to achieve pitch variations and control in a rigid rotor, without adding moving parts. For example, the link 146 may take the place of a feathering hinge.

As illustrated in FIG. 3, the rotor 114 includes a rigid rotor (e.g., a hingeless rotor with blades flexibly attached to the rotor hub 142). Loads from flapping and lead/lag forces are accommodated through the plurality of rotor blades 144 flexing, rather than through hinges. For example, the plurality of rotor blades 144 may bend or flex along the plane of rotation (lead/lag flexing) or into and out of the plane or rotation (flapping). By flexing, the plurality of rotor blades 144 eliminate weight and complexity as compared to hinged rotor systems.

In other implementations, the rotor 114 includes a semi-rigid rotor (e.g., a teetering or seesaw rotor) or an articulated rotor. In a semirigid rotor, the plurality of rotor blades 144 (e.g., 2 rotor blades) share a common flapping or teetering hinge at the rotor hub 142. This allows the plurality of rotor blades 144 to flap together in opposite motions like a seesaw. In an articulated rotor, the rotor 114 includes a horizontal hinge, a vertical hinge, or a combination thereof. The horizontal hinge (e.g., a flapping hinge) allows the each of the blades to move up and down independent of each other. The vertical hinge (e.g., a lead-lag hinge or a drag hinge) allows each of the blades to move back and forth independent of each other. In some implantations, the hinges are coupled to the rotor hub 142 and the link 146. The rotor 114 is not a fully articulated rotor as the rotor 114 does not include a feathering hinge to tilt the plurality or rotor blades independently.

Figure 4:
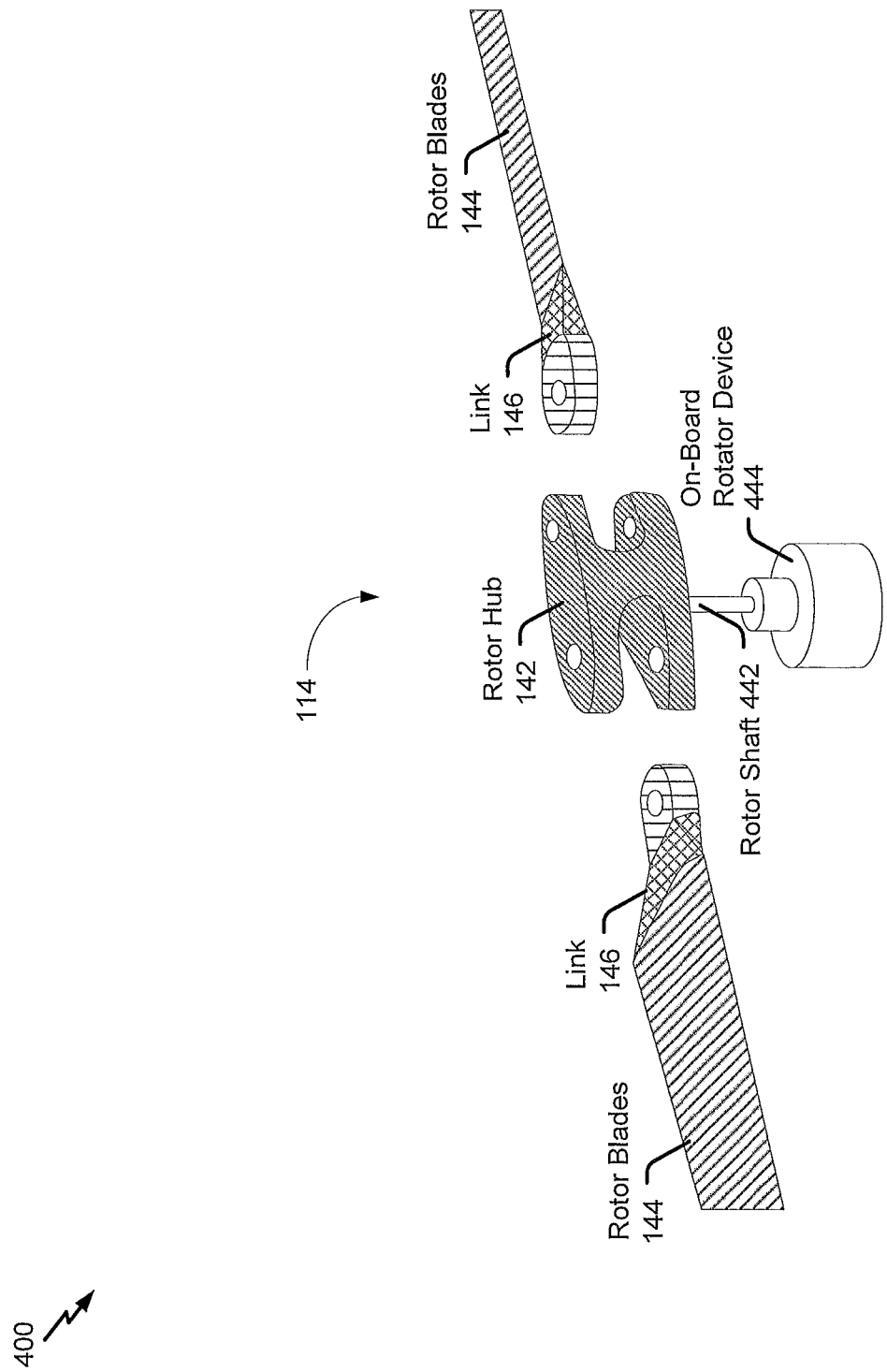
FIG. 4 is a diagram that illustrates a second example of a rotor of an autogyro.

FIG. 4 depicts another example 400 of the rotor 114 of the autogyro 102 of FIG. 1. As compared to FIG. 3, the autogyro 102 includes an on-board rotator device 444 coupled to the rotor 114. The on-board rotator device 444 is configured to generate power and provide the power to rotate the rotor hub 142. The on-board rotator device 444 is coupled to the rotor hub 142 via a rotor shaft 442 (e.g., a rotor mast). In some implementations, the on-board rotator device 444 is configured to rotate the rotor hub 142 during a vertical take-off operation. In some such implementations, the on-board rotator device 444 is configured to rotate the rotor hub 142 during a vertical landing operation. The on-board rotator device 444 includes or corresponds to at least one of an electric motor, a pneumatic motor, a hydraulic motor, or a hybrid motor. In a particular implementation, the on-board rotator device 444 includes a brushless electric motor. In some implementations where the on-board rotator device 444 includes an electric or hybrid motor, the on-board rotator device 444 is configured to receive energy from a battery, an alternator (e.g., an alternator coupled to the engine 116), a wireless energy source (e.g., included in a ground-based station 104), or a combination thereof.

Additionally, or alternatively, the on-board rotator device 444 is configured to rotate the rotor hub 142 during flight. For example, the on-board rotator device 444 is configured to provide a portion of the power used to rotate the rotor hub 142 during forward flight. As an illustrative example, the on-board rotator device 444 provides 10 percent of the power used to rotate the rotor hub 142 to a speed used during forward flight. In such implementations, the autogyro 102 includes a partially-powered rotor 114. By using an on-board rotator device 444, the autogyro 102 may reduce a pitch angle of the rotor hub 142 and of the plurality rotor blades 144, which reduces drag. Accordingly, the autogyro 102 is more energy efficient.

In some implementations, the on-board rotator device 444 is modular and is configured to be coupled to and decoupled from the autogyro 102. For example, the on-board rotator device 444 is coupleable to and decoupleable from the frame 112 of the autogyro 102. As an illustrative example, the on-board rotator device 444 may be coupled to the autogyro 102 when traveling to a location that is not equipped with a ground-based station (and pre-rotator device) and decoupled from the autogyro 102 when traveling to a location that is equipped with a ground-based station (and pre-rotator device).

In some implementations, the on-board rotator device 444 is powered by wireless energy delivery during a vertical take-off operation. In such wireless energy transfer implementations, the ground-based station 104 includes a wireless transmitter configured to transmit energy to the autogyro 102. The wireless transmitter may include or correspond to a laser, a microwave transmitter, a radiofrequency transmitter, or other wireless energy transmitter. Additionally, the autogyro 102 includes a wireless energy receiver configured to receive the energy and provide the energy to the on-board rotator device 444. By using wireless energy transfer, an energy source (e.g., a battery or an alternator) stored on-board of the autogyro 102 is reduced or eliminated. Accordingly, the weight of the autogyro 102 is reduced; the speed and range of the autogyro 102 is improved. Additionally, wireless energy transfer may enable the autogyro 102 to be re-charged in flight.

In other implementations, the on-board rotator device 444 is electrically connected to the ground-based station 104 (e.g., via a wired connection). In such wired energy transfer implementations, the connector 132 may include or correspond to an electrical wire or cable. In a particular implementation, the connector 132 includes or corresponds to a retractable electric cable.

The autogyro 102 and the rotor 114 of FIG. 4 may have increased performance as compared to the autogyro 102 and the rotor 114 of FIG. 3. For example, the autogyro 102 and the rotor 114 of FIG. 4 may enable vertical take-off independent of a ground-based station, increased speed and range, and may enable recharging in-flight. The autogyro 102 and the rotor 114 of FIG. 4 have increased complexity and cost as compared to the autogyro 102 and the rotor 114 of FIG. 3. The autogyro 102 and the rotor 114 of FIG. 4 may have increased performance as compared to autogyros that have active pitch control mechanisms or that use on-board pre-rotator devices. For example, the autogyro 102 of FIG. 4 is lighter and less complex than autogyros that have active pitch control mechanisms. The autogyro 102 of FIG. 4 has increased efficiency as compared to autogyros that have an on-board pre-rotator device because the autogyro 102 of FIG. 4 uses the on-board rotator device 444 to power the rotor 114 during flight to reduce energy consumption of an engine of the autogyro 102. To illustrate, a 10 percent (of the power used by the engine for level flight) power input into the rotor 114 may reduce engine power output by 25 percent for level flight with only a 3 percent weight penalty for additional energy storage (e.g., increase in battery weight for the on-board rotator device 444 minus fuel weight reduction for the engine). Accordingly, the autogyro 102 may exhibit an efficiency increase of greater than 10 percent. Additionally, use of the on-board rotator device 444 enables the autogyro 102 to be designed to have or use a lower angle for the rotor hub 142 (i.e., the rotor hub 142 is tilted aft less) because the autogyro 102 generates more lift with a partially powered rotor 114. The use of the lower angle for the rotor hub 142 decreases drag on the autogyro 102 and increases efficiency.

Figure 5:
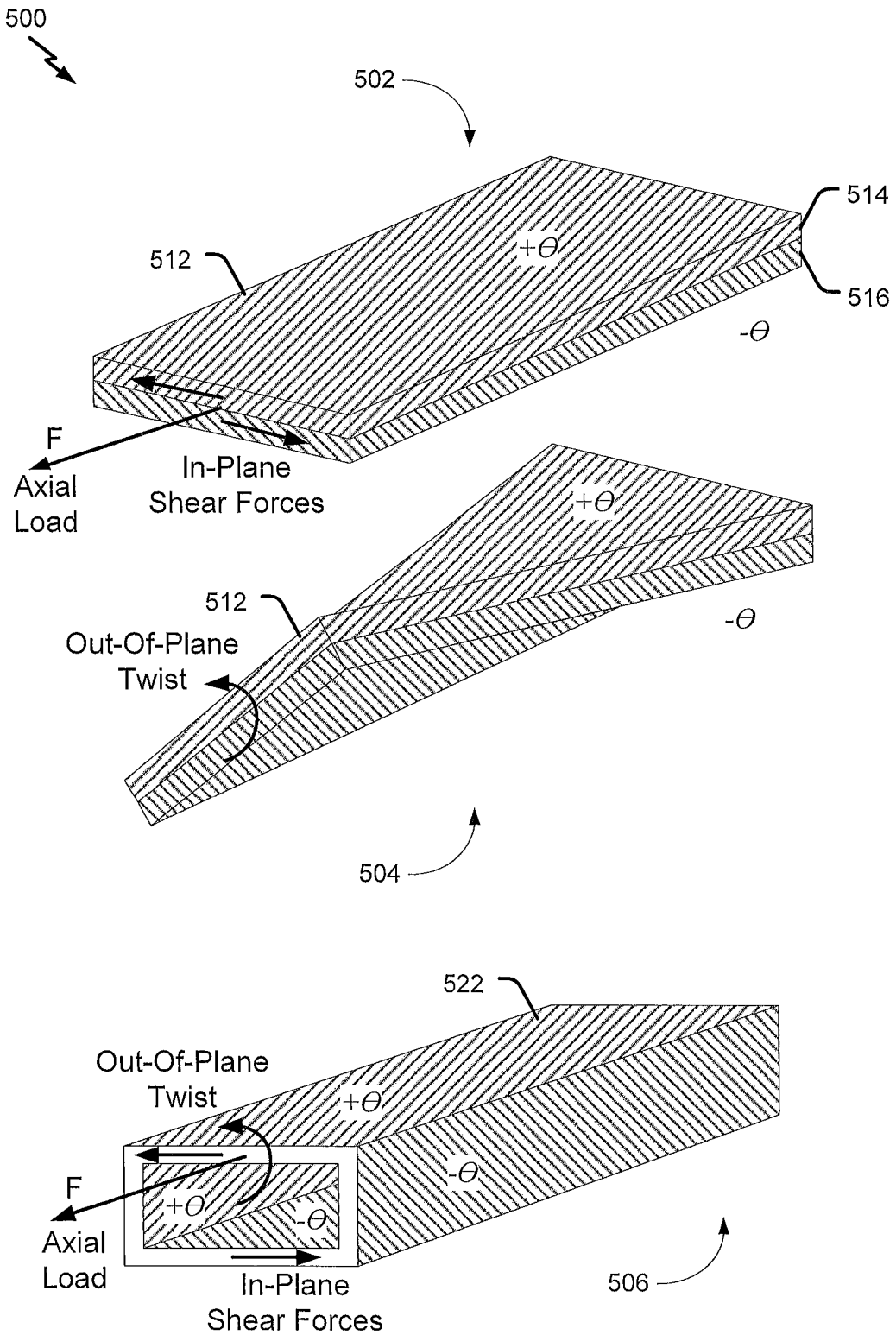
FIG. 5 is a diagram that illustrates examples of composite structures having a fiber layout that exhibits extension-twist coupling.

FIG. 5 is a diagram 500 that illustrates examples of composite structures having a fiber layout enabling extension-twist coupling. The flexible matrix composites may be used as or to form the links 146 of the plurality of rotor blades 144, the blade spars 148 of the plurality of rotor blades 144, or both of FIGS. 1-4.

Diagram 502 illustrates a flexible matrix composite 512 having an antisymmetrical fiber orientation. The flexible matrix composite 512 includes a first layer 514 (e.g., one or more plies of fiber material) having a first fiber orientation angle (e.g., $+\theta$) and a second layer 516 (e.g., one or more plies of fiber material) having a second fiber orientation angle (e.g., $-\theta$). The absolute value of the fiber orientation angles $\theta$ is greater than 0 degrees and less than 90 degrees. The fiber orientation angles may have the same magnitude (e.g., +20 degrees and −20 degrees) or different magnitudes (e.g., +10 degrees and −15 degrees). In other implementations, the flexible matrix composite 512 includes additional layers, e.g., more than two layers may be used. The additional layers may include fibers arranged at the first fiber orientation angle, the second fiber orientation angle, or a third fiber orientation angle.

The flexible matrix composite 512 (e.g., a composite laminate having antisymmetric fiber orientation) may be formed by stacking plies (with respect to a thickness) having the first fiber orientation angle (e.g., $+\theta$) and the second fiber orientation angle (e.g., $-\theta$). The flexible matrix composite 512 undergoes shear deformation under an axially applied load (represented by F in the diagram 502). This shear deformation is equivalent to applying a couple (a pair of equal and parallel forces acting in opposite directions) in a cross-sectional plane of the flexible matrix composite 512. The diagram 502 illustrates the resulting in-plane shear forces of the shear deformation caused by the axial load. The axial load and the in-plane shear cause the flexible matrix composite 512 to experience an out-of-plane twist, as illustrated in diagram 504. The in-plane shear forces produce a moment (torque) which causes twisting deformation about an axis perpendicular to the plane containing the in-plane shear forces. The moment (torque) is independent of a reference point, (i.e., a magnitude of the moment is the same for all points in the plane of shear forces). The diagram 504 illustrates the extension twist-coupling behavior of the flexible matrix composite 512 under the axial load.

Diagram 506 illustrates a flexible matrix composite box beam 522. For the box beam 522, the antisymmetric fiber orientation may be obtained with respect to a cross-section mid-plane, as shown in FIG. 5. Each wall of the box beam 522 consists of n plies, each having a thickness t. Each of the n plies of a particular wall of the box beam 522 have the same fiber orientation angle. As illustrated in the diagram 506 of FIG. 5, a left wall and a top wall of the box beam 522 include plies having the first fiber orientation angle (e.g., +θ) and a right wall and a bottom wall of the box beam 522 include plies having the second fiber orientation angle (e.g., −θ). The diagram 506 illustrates the axial load, the resulting couple (the in-plane shear), and the out-of-plane twist.

Although the flexible matrix composite 512 and the box beam 522 are illustrated as a rectangular in the diagram 506 of FIG. 5, the flexible matrix composite 512 and the box beam 522 may be formed into other shapes. For example, the flexible matrix composite 512 or the box beam 522 may be tubular and have a circular or oval cross-section. Increasing a thickness or a temperature of the flexible matrix composite 512 or the box beam 522 affects the extension-twist coupling behavior. To illustrate, increasing the thickness decreases twisting and increasing the temperature increases twisting. Additionally, the fiber orientation angle θ affects the extension-twist coupling behavior. As an illustrative, non-limiting example for a particular flexible matrix composite, a maximum twist occurs when the absolute magnitude of the fiber orientation angles θ are between 10 and 20 degrees and the magnitude of the fiber orientation angles θ are the same. In FIG. 5, the out-of-plane twist of the flexible matrix composite 512 and the box beam 522 is counter-clockwise. In other implementations, the out-of-plane twist of the flexible matrix composite 512 and the box beam 522 is clockwise. The direction of the twist may be controlled by reversing a sign of the fiber orientation angles or by reversing a direction of the axial load.

Figure 6:
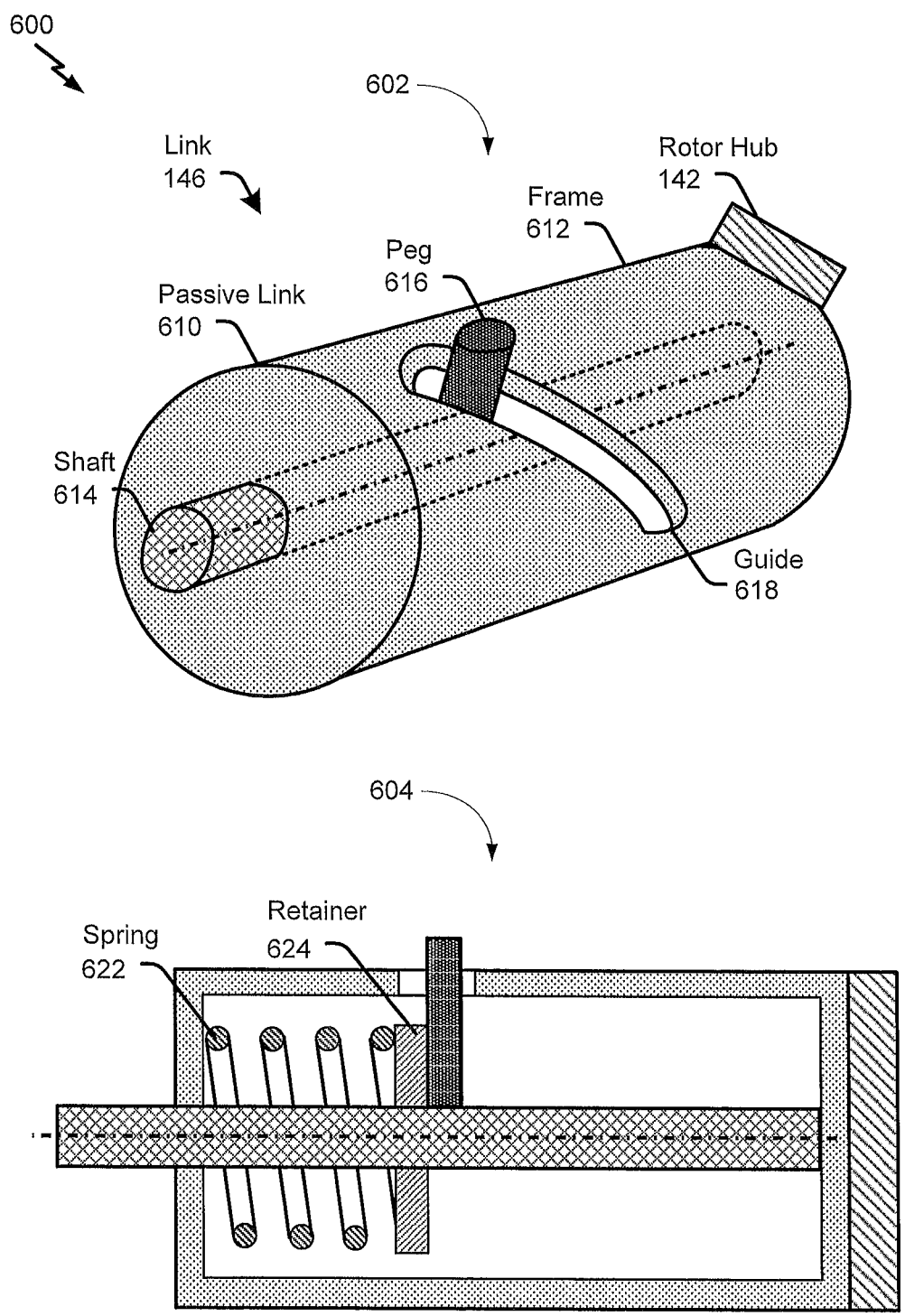
FIG. 6 is a diagram that illustrates an example of passive link.

FIG. 6 is a diagram 600 that illustrates an example of a passive link 610 that exhibits behavior similar to extension-twist coupling behavior. The passive link 610 rotates (twists) a rotor blade to change an angle of attack in response to a change in a magnitude of centrifugal force. The passive link 610 may be used as or to form the links 146 of the plurality of rotor blades 144 of FIGS. 1-4.

FIG. 6 includes an isometric view 602 of the passive link 610 coupled to the rotor hub 142. The passive link 610 includes a frame 612, a shaft 614, a peg 616, and a guide 618. The frame 612 (e.g., a housing) is coupled to the rotor hub 142 and includes the shaft 614 and the guide 618. The shaft 614 includes or is coupled to the peg 616 and is coupled to a blade spar, such as the blade spar 148 of FIG. 1. The guide 618 includes a channel and the peg 616 is configured to move within the channel of the guide 618. In other implementations, the shaft 614 is coupled to the rotor hub 142 and the frame 612 is coupled to the blade spar.

The shaft 614 is disposed within the frame 612 and is moveable with respect to the frame 612. For example, the shaft 614 may move back and forth with respect to the frame 612 responsive to changes in centrifugal force caused by rotation of the rotor hub 142. To illustrate, responsive to a centrifugal force or an increase in centrifugal force (e.g., an increase in rotational speed of the rotor hub 142), the shaft 614 moves away from the rotor hub 142. As the shaft 614 moves away from the rotor hub, the shaft 614 rotates as the peg 616 moves through the channel of the guide 618. Rotation of the shaft 614 rotates (twists) the blade spar in a first direction to increase an angle of attack and a blade pitch distribution, such as from a first angle of attack to a second angle of attack.

FIG. 6 further includes a cross-section view 604 of the passive link 610 coupled to the rotor hub 142. The passive link 610 includes a spring 622 and may include a retainer 624. The spring 622 is disposed around the shaft 614 and is coupled to the frame 612 and to the shaft 614, such as via the peg 616 or the retainer 624. The spring 622 is configured to exert a force on the shaft 614 to bias (e.g., move and rotate) the shaft 614 towards the rotor hub 142 and towards an unrotated state. To illustrate, responsive to a reduction in centrifugal force (e.g., a reduction in rotational speed of the rotor hub 142), the force exerted by the spring 622 on the shaft 614 overcomes the centrifugal force (or a portion thereof) on the shaft 614 and the blade spar. As the force of the spring 622 overcomes the centrifugal force, the spring 622 moves the shaft 614 towards the rotor hub 142 and the shaft 614 rotates in a reverse direction (e.g., decreases the angle of attack and the blade pitch distribution) as the peg 616 moves through the channel of the guide 618. The retainer 624 may be coupled to the spring 622, the shaft 614, the peg, 616, or a combination thereof. The retainer 624 is configured to hold the spring 622 in place and to transfer the force exerted by the spring 622 to the shaft 614, the peg 616, or both.

In some implementations, the spring 622 is a variable spring. To illustrate, the spring 622 may be a coil spring including a first section having a first diameter and a second section having a second diameter. The varying diameters of the first section and the second section cause the spring 622 to exhibit a different amount of force (e.g., different resistance to centrifugal force) at different locations, causing the passive link 610 to produce an intermediary angle of attack (e.g., a third angle of attack greater than the first angle of attack and less than the second angle of attack) for a larger range of centrifugal forces. In other implementations, the passive link 610 may include multiple springs.

Figure 7:
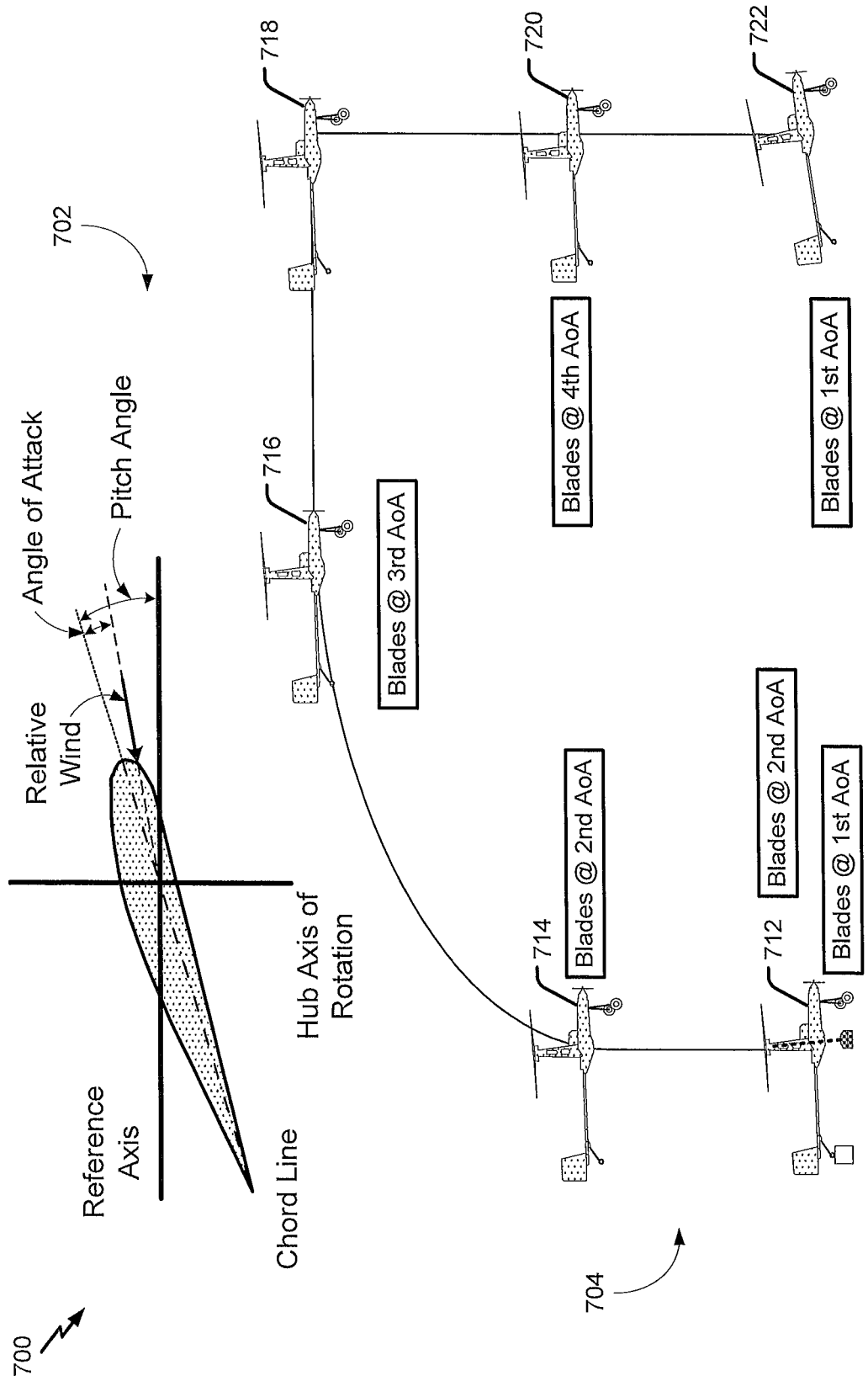
FIG. 7 is a diagram that illustrates an example of a flight profile of an autogyro.

FIG. 7 is a diagram 700 that illustrates an example of a flight profile 704 of the autogyro 102 of FIG. 1. The diagram 700 also includes a representation of a profile view 702 of a rotor blade of the autogyro 102.

The profile view 702 illustrates a pitch angle and an angle of attack of the rotor blade. In the profile view 702, an axis of rotation is illustrated as a vertical axis and represents a center of a rotor hub coupled to the rotor blade. A reference axis (reference plane) is illustrated as a horizontal axis and represents the plane that the rotor blade rotates in around the axis of rotation. A chord line, illustrated in the profile view 702 as a dotted and dashed line, is a straight line intersecting leading and trailing edges of the rotor blade. The angle of incidence is angle between the chord line of the rotor blade and the rotor hub (i.e., the reference axis). The angle of incidence is a technical angle rather than an aerodynamic angle and is often referred to as the blade pitch angle or pitch angle. The angle of attack is an angle between the chord line of the rotor blade and a resultant relative wind. The angle of attack is an aerodynamic angle and the angle of attack can change with no change in the blade pitch angle (e.g., based on a change in the resultant relative wind). The resultant relative wind is based on a speed and direction of the airflow through the rotor blades. In the absence of airflow (resultant relative wind), the angle of attack and the blade pitch angle are the same. When a resultant relative wind is present, the angle of attack is different (e.g., smaller as illustrated in FIG. 7) from the blade pitch angle. If the blade pitch angle is increased, the angle of attack increases; if the blade pitch angle is reduced, the angle of attack is reduced, when the resultant relative wind remains unchanged. A change in the angle of attack changes the coefficient of lift, thereby changing the lift produced by the rotor blade.

The angle of attack may refer to the angle of attack at the tip of the rotor blade, the hub of the rotor blade, or at a point in between the tip and the hub (e.g., 0.75 chord length). Additionally, the angle of attack of the rotor blade may refer to the angle of attack at a specific point along a cycle of rotation of the rotor blade because the angle of attack of the rotor blade may change as it rotates around the rotor hub 142 during each cycle of rotation. Each rotor blade may have multiple different angles of attack along the length of the rotor blade. A blade pitch distribution includes the multiple different angles of attack along the length of the rotor blade. Each angle of attack may be part of a corresponding blade pitch distribution.

The flight profile 704 illustrates example stages 712-722 of a flight. The flight profile 704 includes a vertical take-off stage 712. During the vertical take-off stage 712, the rotor hub 142 of the autogyro 102 is coupled to the pre-rotator device 152 of the ground-based station 104, and the pre-rotator device 152 rotates the rotor hub 142. Prior to rotation of the rotor hub 142, the plurality of rotor blades 144 are at a first angle of attack of a first blade pitch distribution (e.g., a resting or designed blade pitch distribution). In some implementations, leading edge vortex flaps of the plurality of rotor blades 144 may be activated prior to rotation of the rotor hub 142 to increase lift generated during the vertical take-off stage 712. During rotation of the rotor hub 142, each of the plurality of rotor blades 144 twists (due to centrifugal forces) from the first angle of attack to a second angle of attack. The second angle of attack corresponds to an angle of attack associated with a maximum rotation speed achieved by the rotor hub 142 and a second blade pitch distribution. The autogyro 102 vertically takes-off while the plurality of rotor blades 144 are oriented at the second blade pitch distribution at the instance of take-off. As the autogyro 102 starts to ascend, an angular velocity of the rotor 114 slows down, and the increased rotation of the second blade pitch distribution is reduced as the angular velocity slows down.

In some implementations, the autogyro 102 is coupled to the ground-based station 104 such that the ground-based station 104 opposes motion (e.g., vertical motion, rotational motion, or both) of the autogyro 102. The rotor hub 142 of the autogyro 102 is spun-up to a speed that is greater than needed for vertical lift, and the autogyro 102 is decoupled from the ground-based station 104, such as by the pilot activating the decoupling device 156. The autogyro 102 vertically ascends quickly or "jumps". In other implementations, the autogyro 102 is not coupled to the ground-based station 104 such that the ground based station opposes vertical motion of the autogyro 102. The autogyro 102 is allowed to ascend while the pre-rotator device 152 rotates the rotor hub 142. The rotor hub 142 is then decoupled from the pre-rotator device 152. For example, the connector 132 separates from the pre-rotator device 152 (or a connector coupled thereto) under tension caused by ascension of the autogyro 102. The rotational speed of the rotor hub 142 decreases after decoupling from the pre-rotator device 152 or responsive to the pre-rotator device 152 ceasing to rotate the rotor hub 142. As the rotor hub 142 decrease in rotational speed, each of the plurality of rotor blades 144 decrease in twist from the second angle of attack.

The autogyro 102 activates the engine 116 or engages the propeller 118, and the autogyro 102 enters into a transition stage 714. In the transition stage 714, the autogyro 102 gains forward momentum to transition from the vertical take-off stage 712 to a cruise stage 716 (e.g., forward flight). During the transition stage 714, the autogyro 102 may increase in altitude. In some implementations, the rotor hub 142 may be adjusted to adjust pitch angle of the rotor hub 142 (or shaft thereof). For example, if the autogyro 102 has a Cyclic control, the rotor hub 142 may be tilted fore to aft, port to starboard, or a combination thereof.

During the cruise stage 716, the autogyro 102 may fly at a cruising speed and the pilot may make adjustment to the flight control devices 124 via the flight controls 122. For example, the leading edge vortex flaps of the plurality of rotor blades 144 may be deactivated for the cruise stage 716. Each of the plurality of rotor blades 144 may twist to a third angle of attack of a third blade pitch distribution during the cruise stage 716 based on centrifugal forces generated by a rotational speed of the rotor hub 142 corresponding to the cruising speed. The rotational speed of the rotor hub 142 corresponding to the cruising speed is less than the rotational speed of the rotor hub 142 for vertical take-off. Accordingly, the third angle of attack is greater than the first angle of attack (e.g., the resting or design angle of attack) and is less than the second angle of attack.

After the cruise stage 716, the autogyro 102 may enter a coast stage 718. During the coast stage 718, a pilot may deactivate the engine 116, deactivate the propeller 118 (e.g., decouple the propeller 118 from the engine 116), or both, and enter a coast stage 718. Alternatively, the pilot may reduce engine output or "throttle down" to reduce speed of the autogyro 102. The autogyro 102 reduces in forward speed and the rotation of the rotor hub 142 reduces in speed. The autogyro 102 starts to descend and transitions to the descent stage 720 where the forward flight of the autogyro 102 may be minimal.

During the descent stage 720, the autogyro 102 may prepare for a vertical landing stage 722. For example, the pilot may adjust a pitch angle of the rotor hub 142 to increase the angle of attack of the plurality of rotor blades 144. Additionally, or alternatively, the pilot may activate the leading edge vortex flaps of the plurality of rotor blades 144 to increase lift. As another example, the pilot may activate a heat generation device or may direct heat from the engine 116 to the plurality of rotor blades 144 to perform a flare-out maneuver (e.g., increase blade pitch angle). Alternatively, a controller of the autogyro 102 may activate the heat generation device or direct heat from the engine to the plurality of rotor blades 144 responsive to determining the autogyro 102 has a rate of descent greater than or equal to a threshold or determining that an altitude is less than or equal to a threshold. The plurality of rotor blades 144, including the links 146 thereof, may increase in temperature. By increasing the temperature of the links 146, the plurality of rotor blades 144 may become more susceptible to twisting. To illustrate, for a given centrifugal force, the plurality of rotor blades 144 experience a greater degree of twist and thus a greater angle of attack at higher temperatures compared to lower temperatures. This increase in temperature causes the plurality of rotor blades to increase in twist, which increases lift. The increase in lift slows the rate of descent of the autogyro 102 and provides a softer smoother and more controlled landing during the vertical landing stage 722. Each of the plurality of rotor blades 144 may twist to a fourth angle of attack of a fourth blade pitch distribution during the descent stage 720 (or the vertical landing stage 722), such as during a particular instant during the descent stage 720.

The rotational speed of the rotor hub 142 during descent is less than the rotational speed of the rotor hub 142 at cruise and during vertical take-off. However, the temperature of the plurality of rotor blades 144 (or the links 146 thereof) is increased during descent because of the heat applied to the plurality of the rotor blades. Depending on the properties of the material of the plurality of rotor blades 144, the increase in temperature may cause the plurality of rotor blades 144 to twist to an angle of attack that exceeds that angle of attack at cruise or during vertical take-off. Accordingly, the fourth angle of attack is greater than the first angle of attack and may be greater than or less than the second angle of attack, the third angle of attack, or both. After the autogyro 102 has landed, each of the plurality of rotor blades 144 return to the first angle of attack.

In other implementations, the flight profile 704 may include one or more additional stages. Additionally, or alternatively, one or more of the stages 712-722 may be omitted or duplicated. In some implementations, operation of the autogyro 102 may include driving the autogyro 102 on the ground to the take-off ground-based station or from the landing ground-based station. In some implementations, each of the stages 712-722 (or a particular instance during a stage) may correspond to a range of angles of attack or blade pitch distribution. For example, the autogyro 102 may vertically take-off while the plurality of rotor blades 144 are within a first range of blade pitch distributions, cruise while the plurality of rotor blades 144 are within a second range of blade pitch distributions, and land while the plurality of rotor blades 144 are within a third range of blade pitch distributions. As an exemplarily, non-limiting illustration, the second range of blade pitch distribution for cruise may include or correspond to a range of values plus or minus 15 percent of the third blade pitch distribution for cruise.

Figure 8:
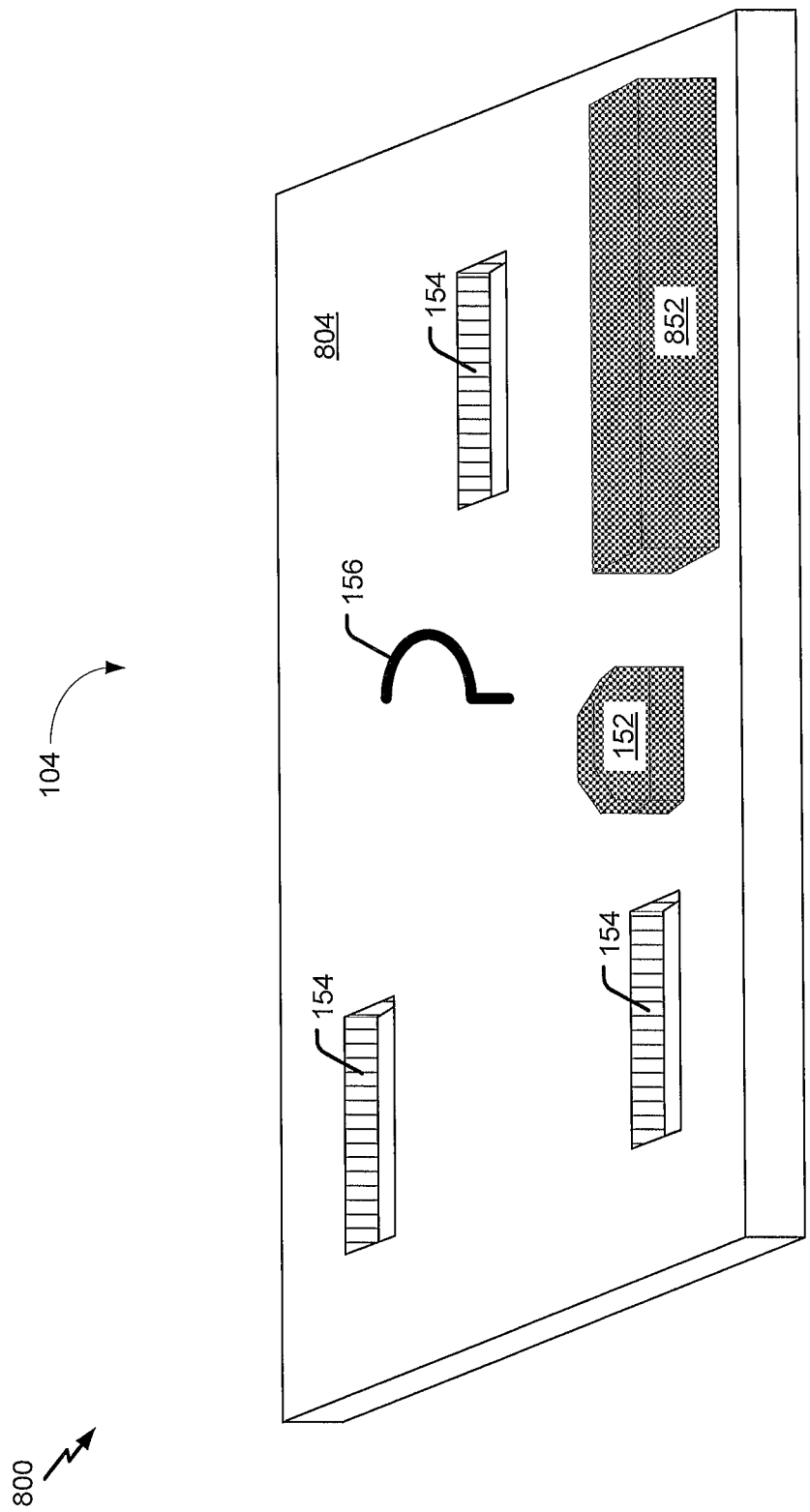
FIG. 8 is a diagram that illustrates an example of a ground-based station for an autogyro.

FIG. 8 is a diagram of an example 800 of the ground-based station 104 for the autogyro 102 of FIG. 1. As illustrated in FIG. 8, the ground-based station 104 includes a landing pad 804 (or a launch pad). In some implementations, the landing pad 804 includes the one or more supports 154 of FIG. 1 configured to receive, couple, or restrain landing gear of the autogyro 102. Additionally, or alternatively, the one or more supports 154 are configured to receive, couple, or restrain a portion of the frame 112 of the autogyro 102 of FIG. 1. The ground-based station 104 may further include the decoupling device 156 of FIG. 1. As illustrated in FIG. 8, the decoupling device 156 include a hook configured to selectively couple to and decoupled from the autogyro 102. In some implementations, the decoupling device 156 includes an actuator configured to activate and deactivate (e.g., engage and disengage) the decoupling device 156.

The ground-based station 104 includes the pre-rotator device 152 configured to rotate the rotor hub 142. In some implementations, the ground-based station 104 includes mechanical linkage and connectors configured to connect the pre-rotator device 152 to the rotor 114, as described with reference to FIG. 2. In some such implementations, the ground-based station 104 further includes an energy source 852 configured to provide energy to the pre-rotator device 152. In other implementations, the pre-rotator device 152 includes or corresponds to an energy source. In some such implementations, the ground-based station includes a wireless energy transmitter, as described with reference to FIG. 4.

The one or more supports 154, the decoupling device 156, or a combination thereof, may be configured to restrain the autogyro 102 from moving (e.g., moving laterally or vertically) while the pre-rotator device 152 rotates (e.g., spins-up) the rotor hub 142. Restraining the autogyro 102, allows the rotor hub 142 to be rotated at a speed greater than needed for lift-off and to achieve a speed such that the autogyro 102 will "jump" vertically to a height such that the engine 116 of the autogyro 102 can be activated to engage in forward flight and clear objects. By using a ground-based pre-rotator device (e.g., the pre-rotator device 152), the autogyro 102 does not incur a weight penalty from having an on-board pre-rotator device and the autogyro has increased performance.

Figure 9:
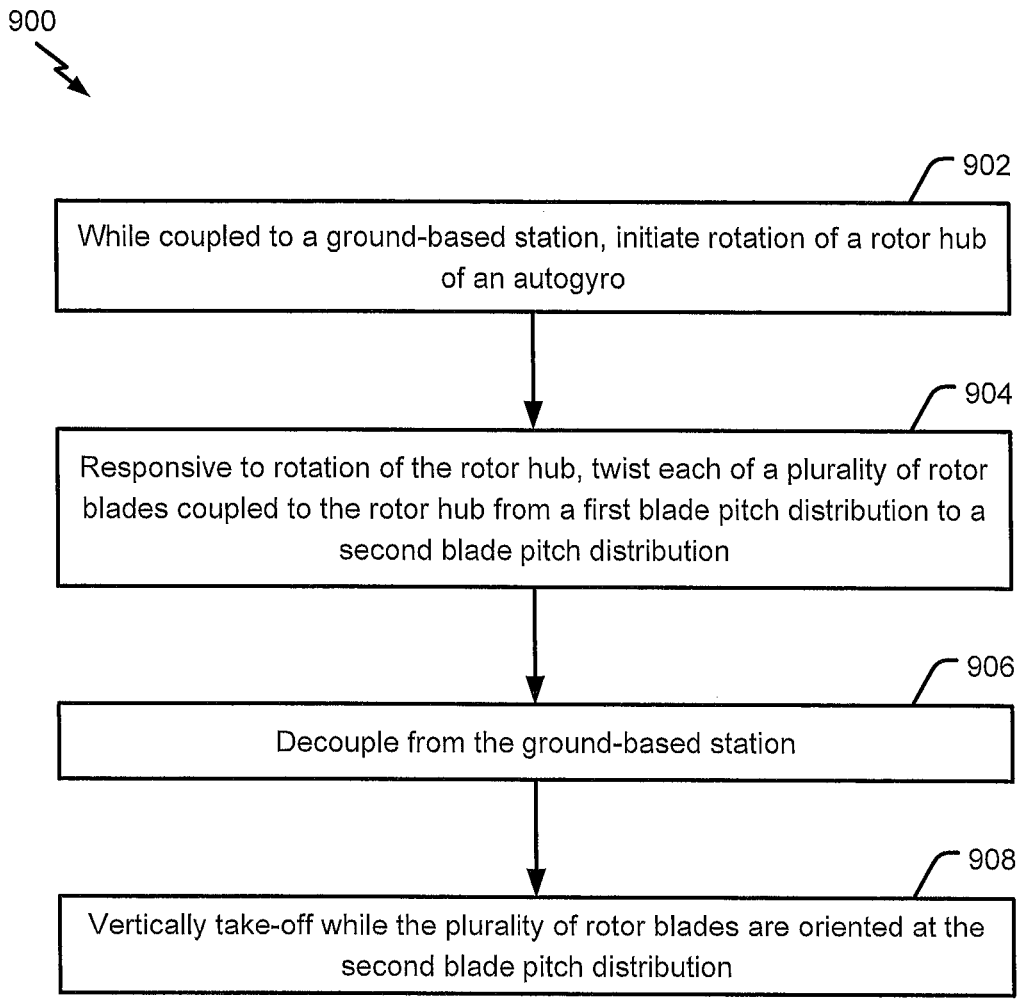
FIG. 9 is a flow chart of an example of a method of performing a vertical take-off operation of an autogyro.

FIG. 9 is a flowchart of a method 900 of performing a vertical take-off operation of an autogyro. The autogyro may include or correspond to the autogyro 102 of FIG. 1. The method 900 may be performed by the autogyro 102 of FIG. 1. The method 900 includes, at 902, while the autogyro is coupled to a ground-based station, initiating rotation of a rotor hub of the autogyro. For example, while the autogyro 102 is coupled to the ground-based station 104, the rotor hub 142 of the rotor 114 is rotated (e.g., spun-up), as described with reference to FIG. 1. The autogyro 102 may be coupled to the pre-rotator device 152, the one or more supports 154, the decoupling device 156 of the ground-based station 104, or a combination thereof.

The method 900 of FIG. 9 also includes, at 904, responsive to rotation of the rotor hub, twisting each of a plurality of rotor blades coupled to the rotor hub from a first blade pitch distribution to a second blade pitch distribution. For example, each of the plurality of rotor blades 144 twists from a first angle of attack to a second angle of attack responsive to rotation of the rotor hub 142, as described above with reference to FIGS. 1, 3, and 7. To illustrate, the links 146, the blade spars 148, or a combination thereof, may twist due to centrifugal forces (which cause in-plane shear and a resulting moment) generated during rotation of the rotor hub 142 and the plurality of rotor blades 144. The links 146 may include a composite structure having a fiber layout that exhibits extension-twist coupling as described in FIG. 5, the passive link 610 of FIG. 6, or a combination thereof. The angle of attack may refer to the angle of attack at the tip of the rotor blade, the hub of the rotor blade, or at a point in between the tip and the hub (e.g., 0.75 chord length). As another illustration, each of the plurality of rotor blades 144 twists from a first blade pitch distribution to a second blade pitch distribution responsive to rotation of the rotor hub 142, as described above with reference to FIGS. 1, 3, and 7. To illustrate, the blade spars 148 twist due to centrifugal forces and cause a greater increase in angle of attack near the tip of the rotor blade than at the root of the rotor blade.

Additionally, the angle of attack or blade pitch distribution of the rotor blade may refer to the angle of attack or the blade pitch distribution at a specific point along a cycle of rotation of the rotor blade because the angle of attack or the blade pitch distribution of the rotor blade may change as it rotates around the rotor hub 142 during each cycle of rotation. For example, the rotor blades bend flex and or flap during a cycle of rotation and experience variations in angle of attack, blade pitch distribution, or both. As another example, the pitch angle of the rotor hub may cause the rotor blades to experience variations in angle of attack, blade pitch distribution, or both, during a cycle of rotation. Additionally, or alternatively, the angle of attack or blade pitch distribution of the rotor blade may refer to a range of angle of attacks or blade pitch distributions, as described with reference to FIG. 7.

The method 900 of FIG. 9 includes, at 906, decoupling the autogyro from the ground-based station. For example, the autogyro 102 is decoupled from the ground-based station 104 after the rotor hub 142 has reached at target rotational speed. The target rotational speed may generate forces such that the plurality of rotor blades 144 twist to the second blade pitch distribution, as described with reference to FIG. 7. In some implementations, the autogyro 102 is decoupled from the ground-based station 104 by activating/deactivating the decoupling device 156 or a restraint of the ground-based station 104 or a decoupling device or a restraint of the autogyro 102. In other implementations, the autogyro 102 is decoupled from the ground-based station 104 (from the pre-rotator device 152) based on tension generated at or during vertical take-off. In some such implementations, the autogyro 102 vertically takes-off and gains altitude before decoupling from the ground-based station 104. To illustrate, the connector 132 of autogyro 102 decouples from the pre-rotator device 152 under tension generated responsive to the autogyro 102 vertically ascending.

The method 900 of FIG. 9 further includes, at 908, vertically taking-off, by the autogyro, while the plurality of rotor blades are oriented at the second blade pitch distribution. For example, the autogyro 102 vertically ascends and gains altitude while the plurality of rotor blades 144 are twisted at a greater angle of attack (e.g., a second angle of attack of the second blade pitch distribution) than used during autorotation (e.g., the third angle of attack of the third blade pitch distribution) from centrifugal forces (e.g., centripetal forces) generated from rotation of the rotor hub 142. During ascent (e.g., after take-off/light off), the plurality of rotor blades 144 decrease in angle of attack from the second angle of attack.

The autogyro 102 trades the kinetic energy of the spinning rotor blades 144 for potential energy in the form of altitude (an increase in altitude). In some implementations, the vertical take-off includes a jump take-off. To illustrate, the rotor hub 142 is spun-up to a rotational a speed greater than needed to lift-off while the autogyro 102 is restrained by the ground-based station 104. When the autogyro 102 is decoupled from the ground-based station 104, such as by deactivating the decoupling device 156, the autogyro 102 will quickly ascend or "jump".

In other implementations, the autogyro 102 is unrestrained and the vertical ascent is more gradual. As compared to jump take-offs of autogyros that are restrained when spun-up or autogyros that include mechanical rotor blade pitch control, the vertical take-off of the autogyro 102 may be smoother and more controlled. For example, the autogyro 102 may gradually increase in altitude as the rotor hub 142 is rotated by the pre-rotator device 152. The pre-rotator device 152 may continue to rotate the rotor hub 142 after the autogyro 102 has lifted-off the ground. For example, the connector 132 may include a retractable electric cable that is configured to extend in length to stay coupled to the autogyro 102 for a portion of the vertical take-off. Because the plurality of rotor blades 144 twist based on centrifugal forces generated based on rotation of the rotor hub 142, the plurality of rotor blades 144 may twist to different angles during the vertical take-off based on the speed of rotation of the rotor hub 142.

In some implementations, each of the links include a passive link device including a shaft and a spring, the shaft configured to move and twist responsive to rotation of the rotor hub and the spring configured to bias the rotor blade towards the first blade pitch distribution. For example, the links 146 may include the passive link 610 of FIG. 6 that includes the shaft 614 and the spring 622.

In some implementations, the method 900 further includes flying the autogyro. The rotor hub rotates at a first speed at vertical take-off and rotates at a second speed during forward flight. The first speed is greater than the second speed. Therefore, the plurality of rotor blades 144 may partially untwist (e.g., decrease in twist) after vertical take-off due to lower centrifugal forces generated at the lower second speed. In some implementations, during the forward flight each of the plurality of rotor blades is twisted, by a link, at a third angle of attack or a third blade pitch distribution based on centrifugal forces generated from rotation of the rotor hub. The third angle of attack (or the third blade pitch distribution) is greater than the first angle of attack (or the first blade pitch distribution) and is less than the second angle of attack (or the second blade pitch distribution). For example, the plurality of rotor blades 144 may twist to the third angle of attack (or the third blade pitch distribution) while the autogyro 102 is in the cruise stage 716, as described with reference to FIG. 7. The third angle of attack and the third blade pitch distribution may be designed to optimize flight for autorotation.

In some implementations, the method 900 further includes performing a landing operation of the autogyro. For example, the landing operation may include or corresponds to the descent stage 720 and the vertical landing stage 722 of FIG. 7. In some implementations, the landing operation includes providing heat from a heat generation device to the plurality of rotor blades. For example, the engine 116 or the heating device 130 may generate heat and transfer the heat to the plurality of rotor blades 144. In these implementations, the landing operation also includes, responsive to rotation of the rotor hub and the heat, twisting each of the plurality of rotor blades coupled to the rotor hub to a fourth angle of attack or a fourth blade pitch distribution. For example, the autogyro 102 may perform a flare-out maneuver during the descent stage 720 by increasing a temperature of the plurality of rotor blades 144 and the plurality of rotor blades 144 to increase in twist to the fourth angle of attack (or the fourth blade pitch distribution), as described with reference to FIG. 7. In these implementations, the landing operation further includes vertically landing the autogyro while the plurality of rotor blades are oriented at the fourth angle of attack. For example, the autogyro 102 may land vertically during the vertical landing stage 722 while the plurality of rotor blades 144 are at the fourth angle of attack, as described with reference to FIG. 7. The rotational speed of the rotor hub 142 decreases as the autogyro 102 descends, which decreases the lift generated by the autogyro 102. The angle of attack of the plurality of rotor blades 144 decreases with the decrease in speed of the rotor hub 142, which further decreases the lift generated by the autogyro 102. However, heating the plurality of rotor blades 144 increases the angle of attack of the rotor blades and the lift generated by the autogyro 102 at the lower rotational speeds of the rotor hub. Based on material properties of the flexible matrix composites and speeds of the rotor hub 142 during the stages 712-722, the fourth angle of attack may be greater than or less than the second angle of attack. In some implementations, the fourth angle of attack is less than the third angle of attack.

In some implementations, the method 900 further includes activating one or more leading edge vortex flaps of the plurality of rotor blades 144. The leading edge vortex flaps include or corresponds to the flight control device 124 of FIG. 1. The leading edge vortex flaps are configured to generate a stable leading edge vortex at a leading edge of a corresponding rotor blade. The resulting leading edge vortex increases lift. The leading edge vortex flaps may be activated on take-off, on landing, or both.

By using materials that exhibit extension-twist coupling behavior (e.g., a flexible matrix composite with an antisymmetric fiber layout), the change in centrifugal force attributed to the change in rotational speed of the rotor 114 can be used to passively twist the blades. For example, the autogyro has a particular rotor speed range and corresponding twist distribution range for vertical take-off and another rotor speed range with a different corresponding twist distribution range for cruise flight. Greater twist is used for vertical take-off than forward flight. The passive twist rotor blades of the autogyro enable reduced vibrations, enhanced aeroelastic stability, and improved aerodynamic performance. Additionally, the passive twist rotor blades can be designed to enhance performance during vertical take-off and forward flight.

Figure 10:
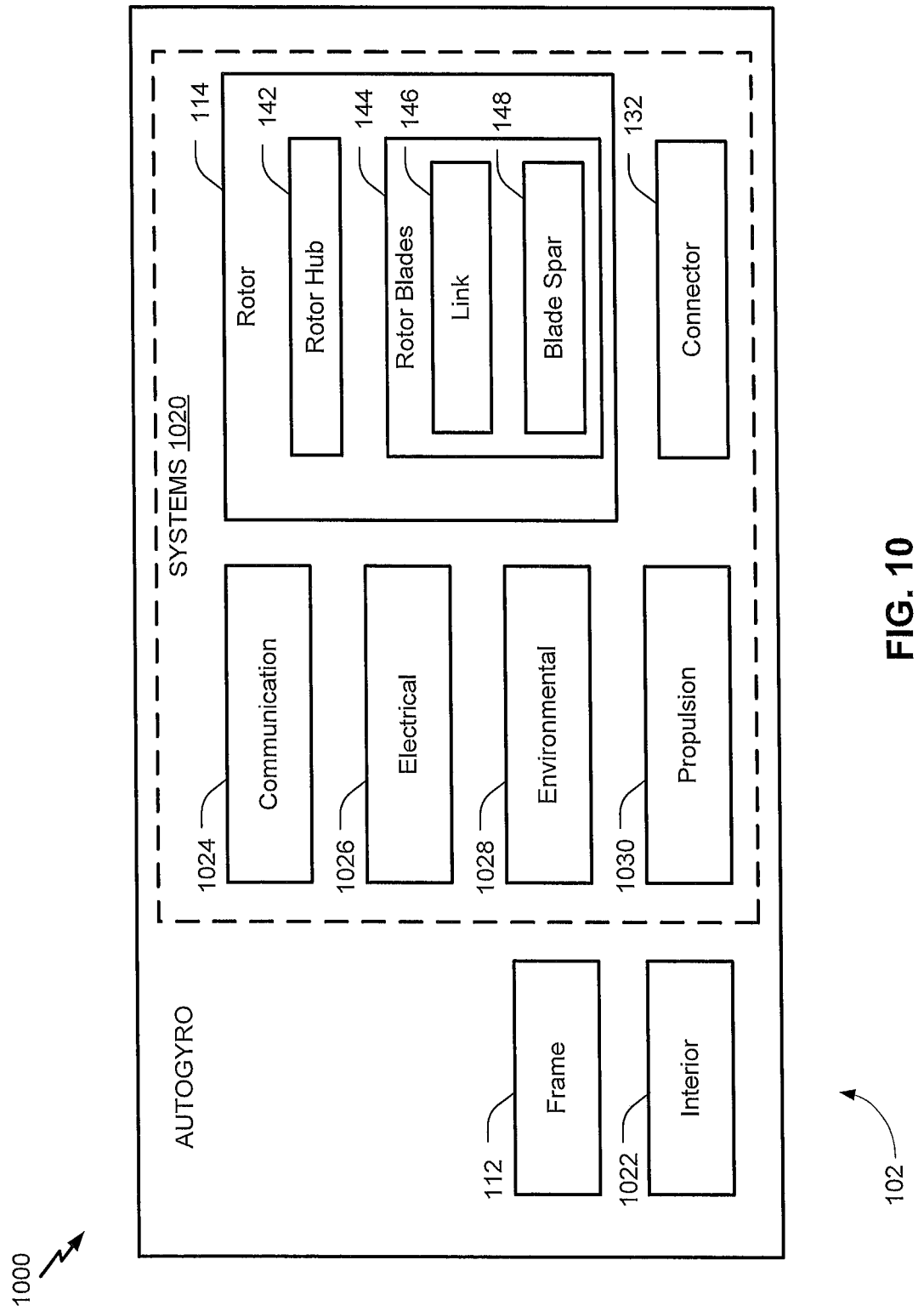
FIG. 10 is a block diagram of an example of an autogyro including a link or blade spar with extension-twist coupling and a connector.

Referring to FIG. 10, a block diagram of an illustrative implementation of the autogyro 102 that includes the links 146 and the connector 132 is shown and designated 1000. As shown in FIG. 10, the autogyro 102 includes the frame 112, an interior 1022, and a plurality of systems 1020. The plurality of systems 1020 includes a communication system 1024, an electrical system 1026, an environmental system 1028, and a propulsion system 1030. In other implementations, the autogyro 102 may include one or more other systems. The autogyro 102 further includes the rotor 114 and the connector 132. The rotor 114 includes the rotor hub 142 and the plurality of rotor blades 144. Each of the plurality of rotor blades 144 includes the link 146 and the blade spar 148. The autogyro 102 may further include a controller configured to execute computer-executable instructions (e.g., a program of one or more instructions) stored in a memory. The instructions, when executed, cause the controller, to perform one or more operations of the method 900 of FIG. 9. In a particular implementation, the controller includes a processor and the memory includes a non-transitory computer-readable medium. In some implementations, the controller is part of the propulsion system 1030.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An autogyro comprising:
a frame;
a rotor hub coupled to the frame;
a connector coupled to the rotor hub, the connector configured to couple the rotor hub to
a ground-based pre-rotator device to rotate the rotor hub during a vertical take-off operation; and
a plurality of rotor blades coupled to the rotor hub, each rotor blade configured such that a speed of rotation of the rotor hub, during the vertical take-off operation, results in twisting a shape of each rotor blade of the plurality of rotor blades from a first shape with a first blade pitch distribution to a second shape with a second blade pitch distribution, wherein the shape of the plurality of rotor blades remains in the second shape during the vertical take-off operation.

2. The autogyro of claim 1, wherein the second blade pitch distribution is greater than the first blade pitch distribution, and wherein the plurality of rotor blades are configured to generate more lift at the second blade pitch distribution.

3. The autogyro of claim 1, wherein each of the plurality of rotor blades includes a link configured to twist a corresponding rotor blade based on centrifugal forces.

4. The autogyro of claim 3, wherein the links comprise composite materials having an anti-symmetrical fiber orientation.

5. The autogyro of claim 3, wherein each of the links comprise a passive link device including a shaft and a spring, the shaft configured to move and twist responsive to rotation of the rotor hub and the spring configured to bias the rotor blade towards the first blade pitch distribution.

6. The autogyro of claim 1, wherein each of the plurality of rotor blades includes a blade spar configured to twist a corresponding rotor blade based on centrifugal forces wherein the blade spars comprise composite materials having an anti-symmetrical fiber orientation.

7. The autogyro of claim 1, further comprising a propeller and an engine coupled to the frame, the propeller configured to generate thrust and move the frame, wherein movement of the frame induces a rotor including the rotor hub and the plurality of rotor blades to autorotate, and wherein autorotation of the rotor results in each of the plurality of rotor blades twisting to a third shape with a third blade pitch distribution.

8. The autogyro of claim 7, wherein the engine is configured to direct heat to the plurality of rotor blades to increase a temperature of the plurality of rotor blades, and wherein the increase in the temperature of the plurality of rotor blades results in each of the rotor blades twisting to a fourth shape with a fourth blade pitch distribution.

9. The autogyro of claim 1, further comprising a heating device configured to increase a temperature of the plurality of rotor blades.

10. The autogyro of claim 1, further comprising at least one of an electric motor, a pneumatic motor, or a hydraulic motor coupled to the connector and the rotor hub and configured to receive energy from the ground-based pre-rotator device and to rotate the rotor hub based on the energy.

11. The autogyro of claim 1, wherein the connector comprises at least one of a rotor shaft or a gear, and wherein the connector includes a quick disconnect fitting configured to decouple from the ground-based pre-rotator device under tension generated during vertical take-off of the autogyro.

12. A system comprising:
an autogyro comprising:
a frame;
a rotor hub coupled to the frame;
a connector coupled to the rotor hub, the connector configured to couple the rotor hub to a ground-based pre-rotator device to rotate the rotor hub during a vertical take-off operation; and
a plurality of rotor blades coupled to the rotor hub, each rotor blade configured such that a speed of rotation of the rotor hub, during a vertical take-off operation, results in twisting a shape of each rotor blade of the plurality of rotor blades from a first shape with a first blade pitch distribution to a second shape with a second blade pitch distribution, wherein the shape of the plurality of rotor blades remains in the second shape during the vertical take-off operation; and
a ground-based station comprising:
the ground-based pre-rotator device configured to rotate the rotor hub; and
an energy source configured to provide energy to the ground-based pre-rotator device.

13. The system of claim 12, wherein the ground-based pre-rotator device comprises at least one of an electric motor, a pneumatic motor, a hydraulic motor, or a mechanical engine.

14. The system of claim 12, further comprising a decoupling device configured to decouple the autogyro from the ground-based station.

15. The system of claim 12, wherein the shape of the plurality of rotor blades reverts to the first shape responsive to the speed of rotation reducing after the vertical take-off operation is complete.

16. The system of claim 12, wherein the ground-based pre-rotator device further comprises:
an output shaft;
a second connector configured to couple to the connector of the autogyro; and
a universal joint coupled to the output shaft and to the second connector, the universal joint configured to transmit power from the output shaft to the second connector at different angles.

17. A method of performing a vertical take-off operation of an autogyro, the method comprising:
while an autogyro is coupled to a ground-based station, initiating rotation of a rotor hub of the autogyro;
responsive to a speed of rotation of the rotor hub, twisting a shape of each of a plurality of rotor blades coupled to the rotor hub from a first shape with a first blade pitch distribution to a second shape with a second blade pitch distribution;
decoupling the autogyro from the ground-based station;
vertically taking-off, by the autogyro, while the plurality of rotor blades have the second shape; and
transitioning to forward flight after vertically taking-off.

18. The method of claim 17, further comprising, flying the autogyro, wherein the rotor hub rotates at a first speed at vertical take-off and rotates at a second speed during the forward flight, and wherein the first speed is greater than the second speed.

19. The method of claim 18, wherein during the forward flight each of the plurality of rotor blades is twisted, by a link, to a third shape with a third blade pitch distribution based on centrifugal forces generated from rotation of the rotor hub, and wherein the third blade pitch distribution is greater than the first blade pitch distribution and is less than the second blade pitch distribution.

20. The method of claim 17, further comprising performing a landing operation of the autogyro, the landing operation comprising:
providing heat from a heat generation device to the plurality of rotor blades;
responsive to rotation of the rotor hub and the heat, twisting each of the plurality of rotor blades coupled to the rotor hub to a fourth shape with a fourth blade pitch distribution; and
vertically landing the autogyro while the plurality of rotor blades are oriented at the fourth blade pitch distribution.

* * * * *